United States Patent [19]

Yoshida et al.

[11] Patent Number: 4,912,519
[45] Date of Patent: Mar. 27, 1990

[54] LASER SPECKLE VELOCITY-MEASURING APPARATUS

[75] Inventors: Tomio Yoshida, Kusatsu; Nobuo Nakatsuka; Hiroshi Kitajima, both of Kyoto; Tsukasa Yamashita, Nara, all of Japan

[73] Assignee: Omron Tateisi Electronics Co., Kyoto, Japan

[21] Appl. No.: 207,864

[22] Filed: Jun. 17, 1988

[30] Foreign Application Priority Data

Jun. 19, 1987 [JP] Japan ............................ 62-154038
Jun. 19, 1987 [JP] Japan ............................ 62-95163[U]

[51] Int. Cl.⁴ .......................... G01P 3/36; G01P 5/22
[52] U.S. Cl. ................................ 356/28; 73/861.06; 364/604; 364/728.03; 364/728.06
[58] Field of Search ................ 356/28.5; 342/378; 367/125; 364/604, 728.03, 728.06; 73/861.06

[56] References Cited

U.S. PATENT DOCUMENTS

| | | | |
|---|---|---|---|
| 3,947,672 | 3/1976 | Harrison et al. | 342/378 |
| 4,201,467 | 5/1980 | Hartmann et al. | 356/28 |
| 4,329,047 | 5/1982 | Kikuchi et al. | 356/28 |
| 4,494,213 | 1/1985 | Thompson | 364/604 |
| 4,580,894 | 4/1986 | Wojcik | 356/28 |
| 4,779,215 | 10/1988 | Moisan et al. | 364/728.06 X |

Primary Examiner—Thomas H. Tarcza
Assistant Examiner—Linda J. Wallace
Attorney, Agent, or Firm—Foley & Lardner, Schwartz, Jeffery Schwaab, Mack, Blumenthal & Evans

[57] ABSTRACT

There is provided a laser speckle velocity-measuring apparatus comprising: a semiconductor laser to irradiate the light to a moving object; first and second photo sensing devices whose light receiving points are arranged in the moving direction of the objects at a predetermined distance so as to be away from each other; a clock signal generating and control circuit for determining a clock frequency of the clock signal so that the number of clocks of the clock signal is always set to a constant value when the delay time of the photo sensing signal of the second photo sensing device for the photo sensing signal of the first photo sensing device is measured by the clock signals; and an arithmetic operating circuit for counting the clock signals and calculating the length, moving distance, or velocity of the object on the basis of the count value. With this apparatus, the detecting time of the length or velocity of the moving object can be reduced and the measuring processes can be performed in a real-time manner.

13 Claims, 19 Drawing Sheets

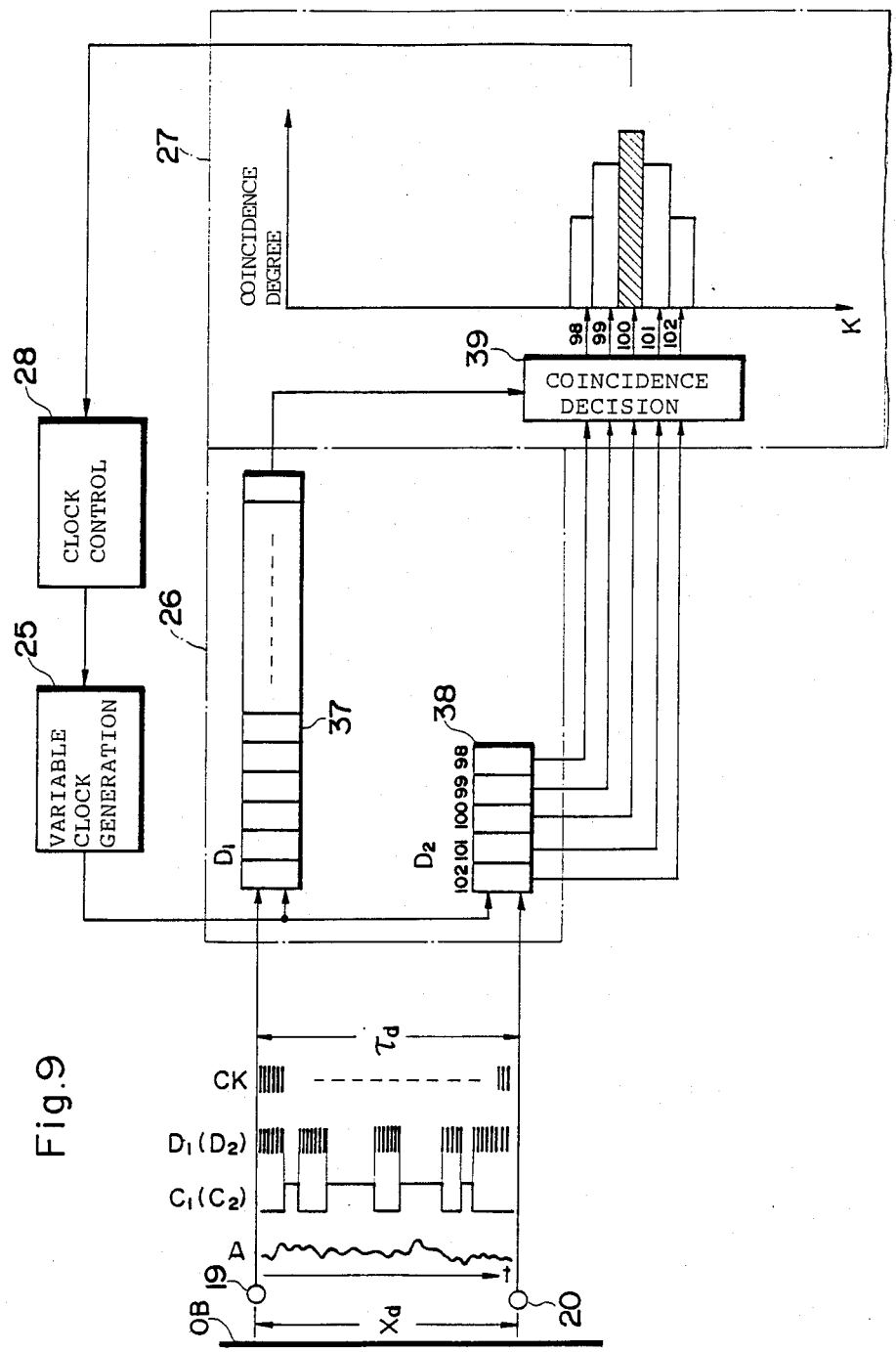

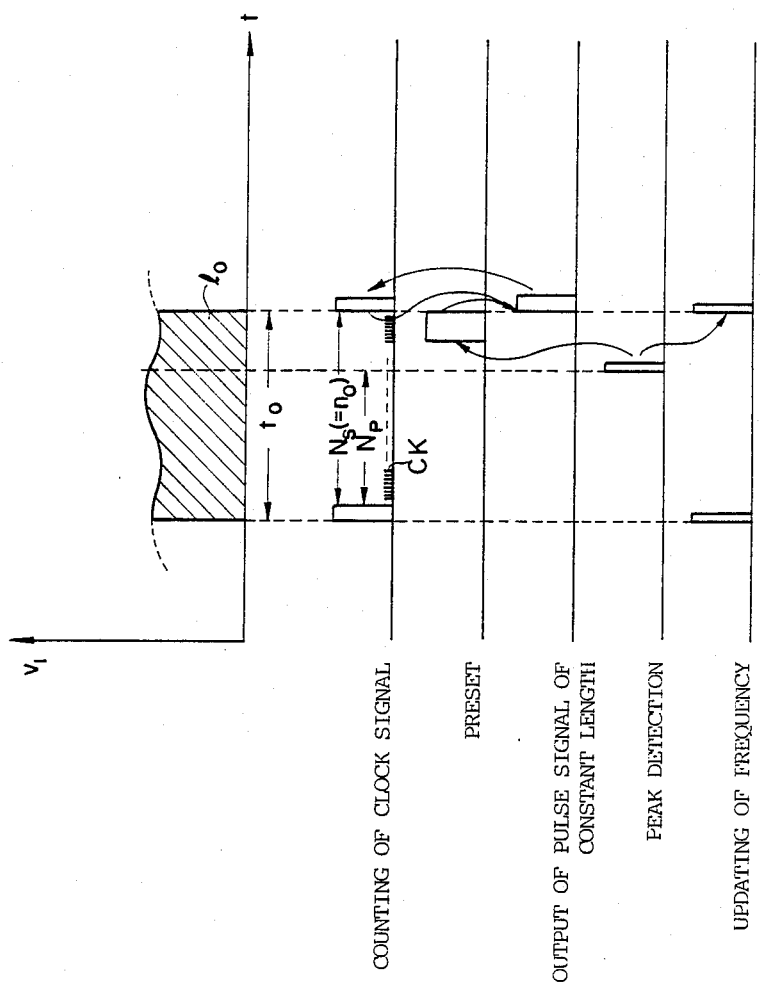

LASER SPECKLE VELOCITY-MEASURING APPARATUS

BACKGROUND OF THE INVENTION

1. Field of the Invention

The present invention relates to a laser speckle velocity-measuring apparatus in which a laser beam is irradiated onto a moving object. Information represented by a speckle pattern which is caused by the scattered light from the moving object is detected, and the velocity of the moving object is measured.

2. Description of the Prior Art

Various kinds of methods have been proposed to measure the velocity by utilizing a laser speckle. A cross-correlation method is known as one of those methods. The principle of the cross-correlation method is shown in FIG. 1. A laser beam LR is irradiated onto an object OB which moves at a velocity V. Although the reflected light from the object OB is scattered and spreads into the space, this scattered light produces a clear dark and light speckle pattern due to the coherent property of the laser beam LR. The speckle pattern moves in conjunction with the movement of the object OB. This moving speckle pattern is detected at first and second photo sensing positions 1 and 2 which are arranged at an interval $X_d$ along the moving direction of the object OB. Reference numerals 1 and 2 indicate the light receiving positions of the photo sensing devices and the photo sensing devices do not need to be arranged at these positions.

Each of the photo sensing devices 1 and 2 converts the received optical signal to the analog electric signal. This electric signal is binarized by a comparator and becomes a binary signal. The binary signal obtained by the second photo sensing device 2 (this signal is referred to as the "delay signal" hereinafter) is detected with a certain delay time $\tau_d$ from the binary signal derived from the first photo sensing device 1 (this signal is referred to as the "preceding signal" hereinbelow).

As shown in FIG. 2, $n_1$ bits of the preceding signal are stored into a memory 5 and $n_2$ bits ($n_2 > n_1$) of the delay signal are stored into a memory 6 each bit at a predetermined sampling period T, respectively. Thereafter, each bit data of the preceding signal is compared with each predetermined bit data of the delay signal by a coincidence deciding circuit 7, thereby discriminating whether the contents of these data coincide or not.

In this case, a check is first made to see if the data of the first to ($n_1$)th bits of the preceding signal coincides with the data of the first to ($n_1$)th bits of the delay signal or not. Thus, the number of bits whose data contents coincide is counted by a counter 8, thereby obtaining the coincidence degree (correlation degree: correlation value) X. The value X denotes the correlation value when the time shift of the memory 6 is set to zero (in the diagram, this state is shown by K=0).

Next, a check is made to see if the data of the first to ($n_1$)th bits in the memory 5 coincides with the data of the second to ($n_1+1$)th bits in the memory 6 or not. The correlation value, that is, the coincidence degree X in a case where the time shift of the memory 6 is set to T (K=1) is obtained by the counting operation of the counter 8.

In a manner similar to the above, the correlation values when the time shift is set to T×j (where, j=0, 1, 2, ...) are obtained, so that a correlation function curve CC having a correlation peak P is obtained as shown in FIG. 3. The delay time $\tau_d$ until the correlation peak P is obtained by the correlation function curve CC. By substituting this delay time $\tau_d$ in the following equation (1), the velocity v of the object OB is calculated. Further, by integrating the velocity v by the time, the length or displacement (moving distance) of the object OB can be calculated.

$$v = k_c \cdot \frac{X_d}{\tau_d} \quad (1)$$

where, $X_d$ denotes the distance between the photo sensing devices 1 and 2 (between the light receiving points) and $k_c$ is a constant.

In the case of the foregoing system, after the necessary data regarding the preceding and delay signals were stored into the memories 5 and 6, the data input is inhibited and the correlating process is executed by driving the memories. Therefore, it takes a long time to detect the correlation peak and, further, to measure the length or velocity of the object. In particular, there is a problem such that it is difficult to perform the high speed processes in a real-time manner.

SUMMARY OF THE INVENTION

The present invention is made to solve the foregoing problems. It is an object of the invention to provide a novel apparatus for measuring a length and a velocity of a moving object in which the times needed to detect the length and velocity of the moving object are reduced and the measuring processes can be performed in a real-time manner.

According to the present invention, this object is accomplished by a laser speckle velocity-measuring apparatus comprising: light projecting means for irradiating a light to a moving object; first and second photo sensing devices whose light receiving points are arranged at a predetermined distance so as to be away from each other in order to receive the scattered light from the surface of the object; clock generating and controlling means for determining a clock frequency in a manner such that when a delay time of a photo sensing signal of the second photo sensing device to a photo sensing signal of the first photo sensing device is measured by a clock signal, the number of clock pulses of the clock signal is always set to a constant value, thereby generating the clock signal; and arithmetic operating means for counting the clock signals and calculating a length or a moving distance or a velocity of the object on the basis of the count value.

According to the invention, the measuring processes can be executed in a real-time manner and the measuring times of the length and velocity are remarkably reduced as compared with the conventional example.

BRIEF DESCRIPTION OF THE DRAWINGS

FIG. 1 is an explanatory diagram of the principle of a speckle velocity-measuring apparatus;

FIG. 2 is an explanatory diagram showing a constitution of the conventional apparatus;

FIG. 3 is an explanatory diagram showing a correlation curve;

FIGS. 9, 10a to 10c, and 11a to 11c are diagrams for explaining the operation principle of a correlation processing section;

FIG. 18 corresponds to FIG. 8 and is a block diagram showing a whole arrangement of an apparatus for measuring a length and a velocity;

FIG. 19 corresponds to FIG. 14 and is a block diagram showing a circuit arrangement of a correlation processing section;

FIG. 20 is an electrical circuit diagram showing an example of a voltage adjusting section;

FIG. 21 is an explanatory diagram showing a region where the balance cannot be detected;

FIG. 22 is a block diagram showing an arrangement of a correlation processing section;

FIG. 23 is an explanatory diagram showing the transition of the operations of a group of counters and of a peak detecting section;

FIG. 24 is a block diagram showing an example of a circuit arrangement of a variable clock generating section;

FIG. 25 is an explanatory diagram showing a method of determining a frequency dividing ratio in the variable clock generating section;

FIG. 26 is an explanatory diagram showing the principle of measurement of a length and a velocity;

FIGS. 27 to 29 show a further another embodiment;

FIG. 27 is a circuit block diagram showing a whole schematic arrangement of an apparatus for measuring a length and a velocity;

FIG. 28 is a block diagram showing an example of a practical arrangement of a peak detecting section; and FIG. 29 is an explanatory diagram showing the principle of the measurement of a length and a velocity.

DETAILED DESCRIPTION OF THE PREFERRED EMBODIMENTS

Figure 1:
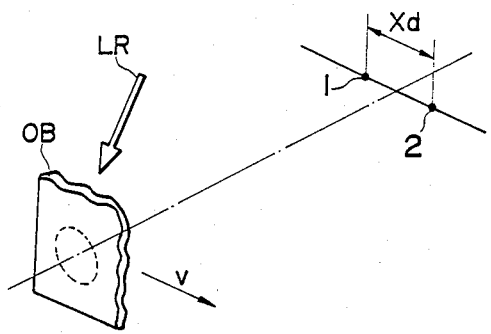
FIGS. 1 to 3 show an example of a conventional apparatus.
Figure 2:
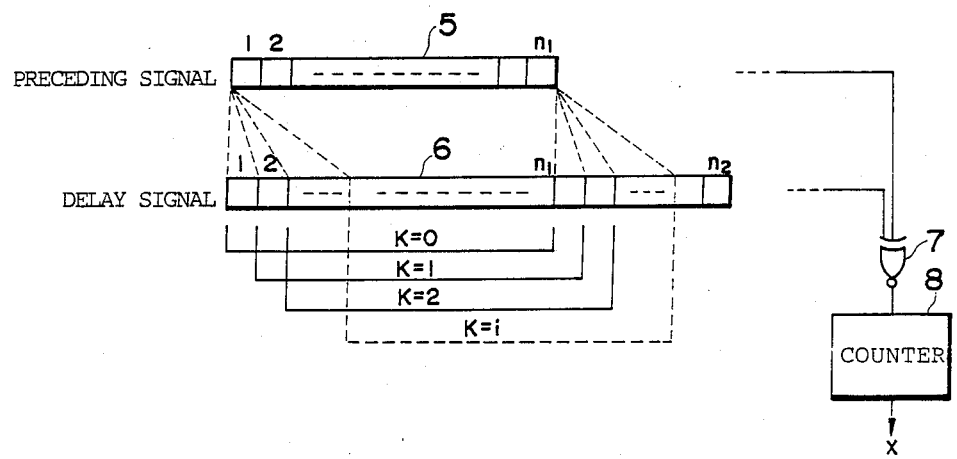
Figure 3:
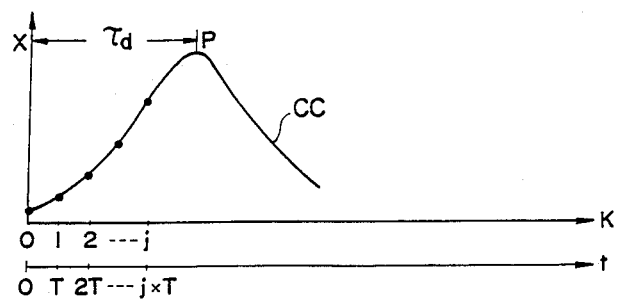
Figure 4:
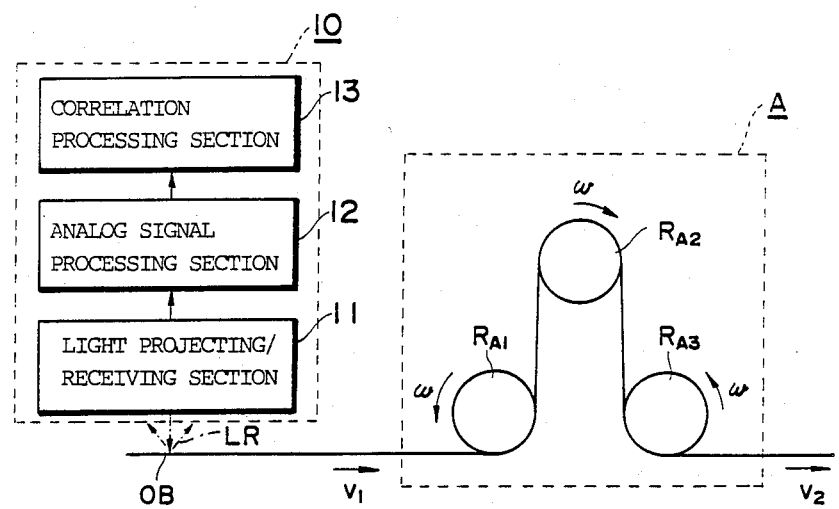
FIG. 4 is an explanatory diagram showing an example of application of a laser speckle measuring apparatus of the present invention.

FIG. 4 shows an example of a laser speckle velocity-measuring apparatus 10 according to the present invention applied to evaluate a speed of the manufacturing line. For example, an object OB like a rolled long plate is carried to a process A at a velocity $v_1$ and departs from the process A at a velocity $v_2$ and advances to the next process. Rollers $R_{A1}$, $R_{A2}$ and $R_{A3}$ in the process A are used to move the object OB an angular velocity $\omega$. Assuming that a radius in this case is set to r, the velocity v is obtained by $v = r\omega$. The velocity v is input as an initial value to the velocity measuring apparatus 10. However, since a slip, an extension of the object OB, and the like occur between the object OB and each of those rollers, the initial value v does not concide with the velocities $v_1$ and $v_2$, namely, $v_1 \neq v_1 \neq v_2$.

The foregoing velocity measuring apparatus 10 is used to measure the velocity $v_1$ and comprises a light projecting/receiving system 11, an analog signal processing section 12, and a correlation processing section 13.

Figure 5:
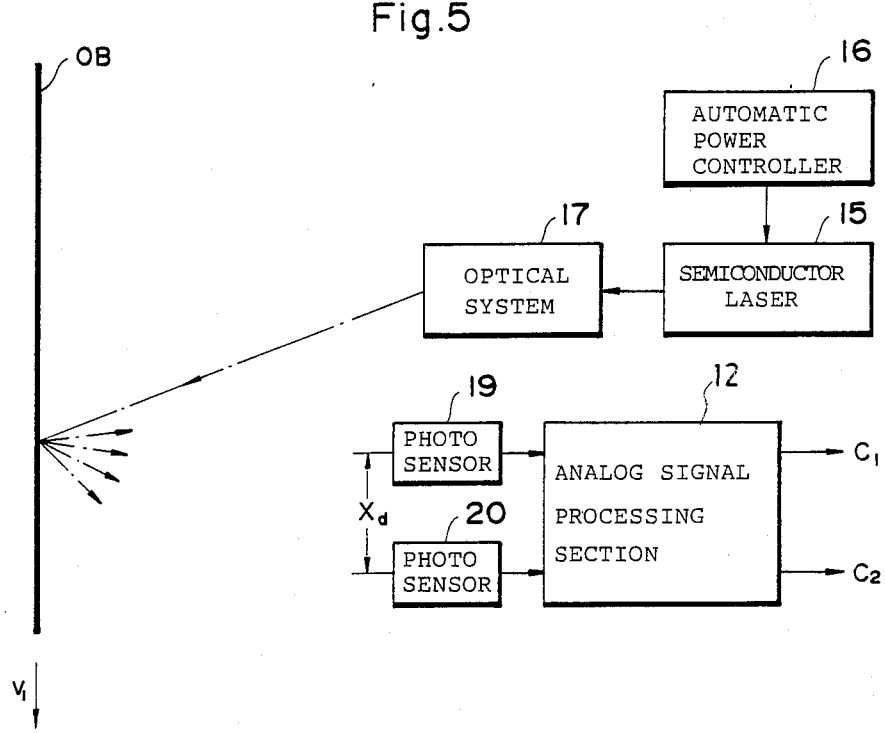
FIG. 5 is a block diagram showing an arrangement of a light projecting/receiving system.

As shown in FIG. 5, the light projecting/receiving system 11 has a light source consisting of a semiconductor laser 15. An output power of the semiconductor laser 15 is stabilized by an automatic power controller (APC) 16. The laser beam emitted from the laser 15 is collimated by an optical system 17 and irradiated onto a moving object OB. The irradiated light is scattered by the surface of the object OB and the reflected light produces a speckle pattern due to the coherent property of the laser beam. The speckle pattern is detected by first and second photo sensing devices 19 and 20 and converted into the electric signals, respectively. These electric signals are sent to the analog signal processing section 12. The photo sensing devices 19 and 20 are arranged along the moving direction of the object OB at the predetermined interval $X_d$ of an average speckle size or more so as to be away from each other. If it is difficult to arrange the two photo sensing devices 19 and 20 such that the interval between the light receiving points of the photo sensing devices 19 and 20 is set to $X_d$, it is sufficient to deflect one of the lights to be received by using a half mirror or the like, thereby setting this interval to be substantially equal to $X_d$.

Figure 6:
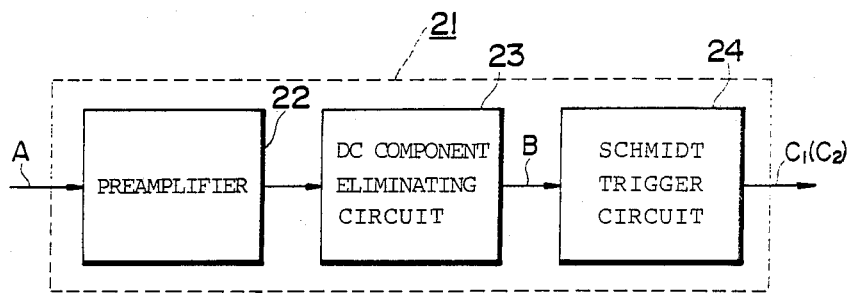
FIG. 6 is a block diagram showing an arrangement of an analog signal processing section.
Figure 7:
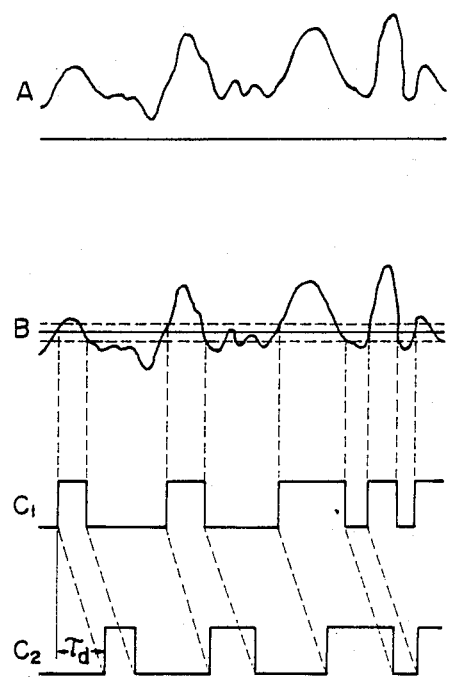
FIG. 7 is a time chart showing operation of each section of the circuit in FIG. 6.

The analog signal processing section 12 has a pair of comparators to binarize the photo sensing signals from the photo sensing devices 19 and 20 by discriminating them on the basis of a predetermined level. FIG. 6 shows an example of a practical arrangement of such comparators. FIG. 7 shows a signal waveform in each section of the comparator.

In FIG. 6, a preamplifier 22 included in the comparator 21 amplifies an output signal A from the photo sensing device. The DC component of the amplified output is cut by a DC component eliminating circuit 23. An output B of the DC component eliminating circuit 23 is given to a schmidt trigger circuit 24. The level of the output B is discriminated by the schmidt trigger circuit 24 on the basis of a schmidt level which is set to a value near the zero level, so that a binary output $C_1$ or $C_2$ is produced. The binary output $C_2$ of the second photo sensing device 20 is delayed from the binary output $C_1$ of the first photo sensing device 19 by a certain delay time $\tau_d$. The binary output $C_1$ is given as the preceding signal to the correlation processing section 13. The other binary output $C_2$ is given as the delay signal to the correlation processing section 13.

Figure 8:
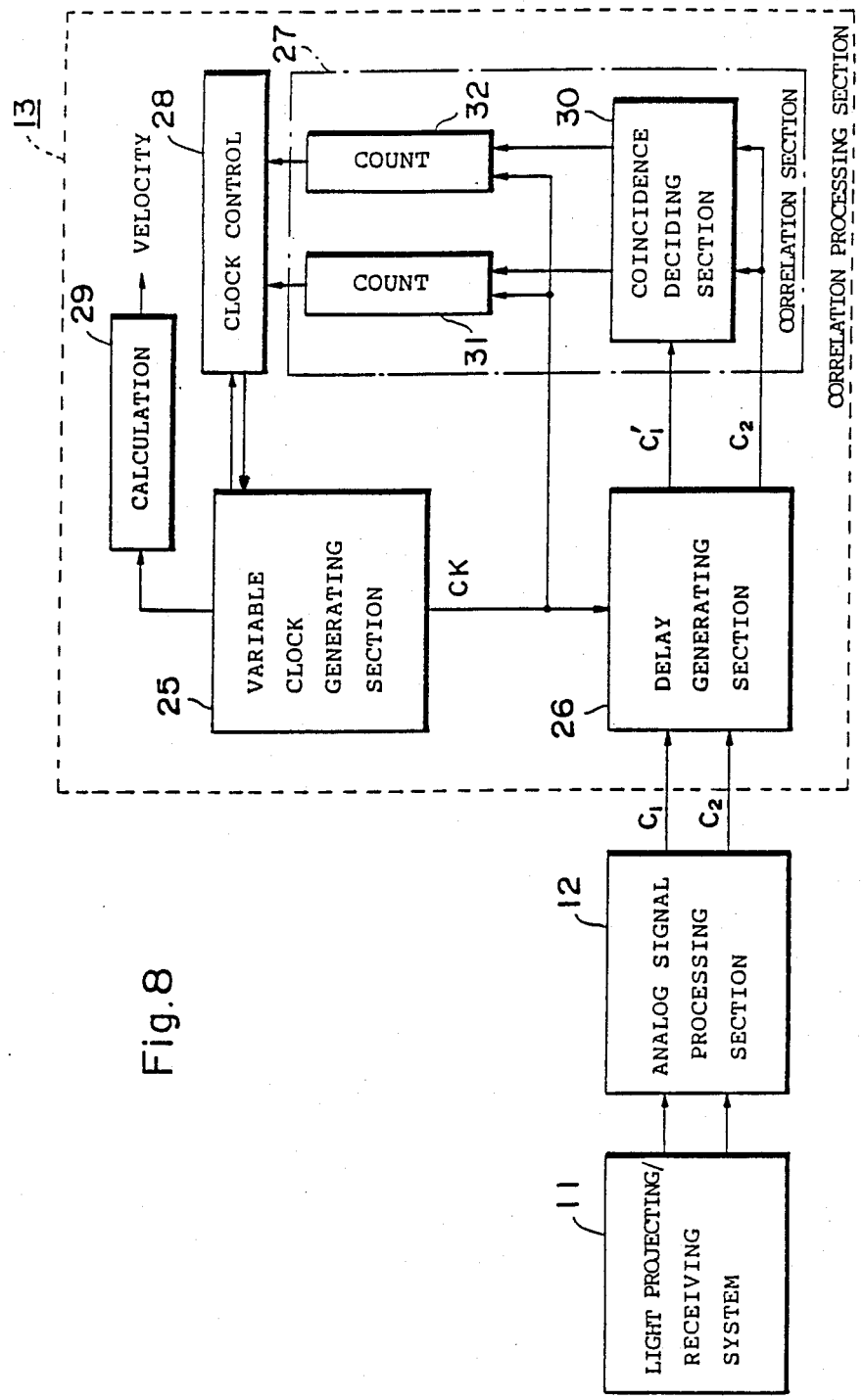
FIG. 8 is a circuit block diagram showing a whole schematic arrangement of an apparatus for measuring a length and a velocity according to an embodiment of the invention.

As shown in FIG. 8, the correlation processing section 13 fundamentally comprises: a variable clock generating section 25, a delay generating section 26, a correlation section 27, a clock control section 28, and a calculating section 29. The variable clock generating section 25 generates a clock signal CK whose frequency $f_{CK}$ is variable. On the basis of the clock signal CK, the delay generating section 26 gives a predeterminwed delay time to the preceding signal $C_1$. The correlating section 27 receives a delayed preceding signal $C_1'$ and the delay signal $C_2$ at the timing of the clock signal CK and compares them, thereby obtaining the correlation degree. The correlating section 27 includes a coincidence deciding section 30 and a pair of counting sections 31 and 32. The clock control section 28 compares the correlation degrees obtained from the counting sections 31 and 32 and changes the frequency $f_{CK}$ of the clock signal CK in accordance with the result of the comparison. The calculating section 29 calculates the velocity $v_1$ of the object OB on the basis of the frequency $f_{CK}$ of the clock signal CK when the correlation degrees coincide, thereby obtaining the velocity $v_1$.

FIGS. 9, 10a to 10c, and 11a to 11c show the principle of the correlating processes in the correlation processing section 13.

In FIG. 9, the delay generating section 26 includes a pair of shift registers 37 and 38. A binary data train of the preceding signal is serially input to the first shift register 37 and a binary data train of the delay signal having the delay time $\tau_d$ with respect to the preceding signal is serially input to the second shift register 38 by being sampled by the clock signal CK, respectively.

Each of the shift registers 37 and 38 is made operative at the timing of the clock signal CK which is generated from the variable clock generating section 25. The binary data of $N_1$ bits (e.g., $N_1=102$) is stored into the first shift register 37 and the binary data of $N_2$ bits (where, $N_2 < N_1$: for instance, $N_2=5$) is stored into the second shift register 38.

Although the variable clock generating section 25 will be explained in detail hereinlater, the frequency $f_{CK}$ of the clock signal CK is initialized such that the delay time $\tau_d$ is set to a corresponding time to a constant value $K_p$ (e.g., 100) as the number of clock pulses.

In the input portion in FIG. 9, a time base is set in the direction from the photo sensing device 19 to the photo sensing device 20 and there are shown: the speckle signal A which is obtained from the photo sensing device; the binary signal $C_1$ (or $C_2$) which is output from the comparator 21; the binary data train $D_1$ (or $D_2$) which is obtained by sampling the binary signal by the clock signal CK and is held into the shift register 37 (or 38); and the clock signal CK.

Figure 10A:
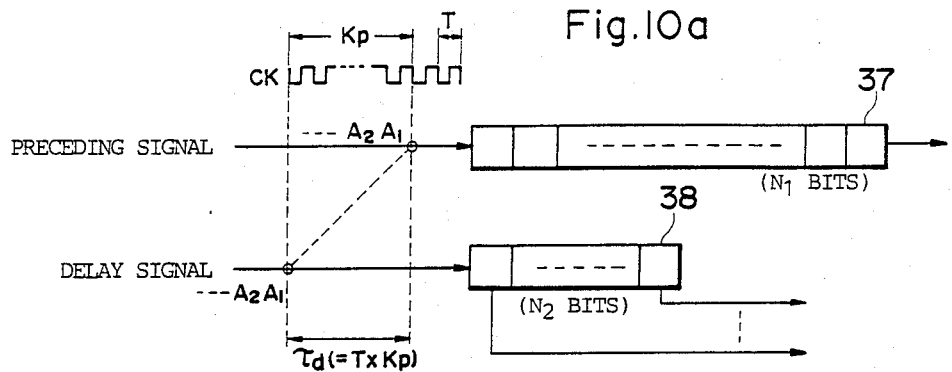

FIG. 10a shows the relation between the shift registers 37 and 38. Data $A_1, A_2, \ldots$ of the preceding signal are sequentially serially input to the first shift register 37. The delay signal which is delayed by the delay time $\tau_d$ corresponding to the number $K_p$ of clock pulses for the preceding signal is serially input to the second shift register 38. Assuming that the period of the clock signal CK is set to T, the delay time $\tau_d$ can be theoretically obtained by $\tau_d = T \times K_p$.

The first shift register 37 serially outputs the binary data received. The second shift register 38 outputs the received binary data in parallel. The data of the output bit of the first shift register 37 and the data of all bits concerned with the parallel outputs of the second shift register 38 are given to a coincidence deciding section 39 (same as the coincidence deciding section 30), thereby discriminating whether these data coincide or not. The coincidence deciding section 39 consists of, for example, $N_2$ exclusive NOR (Ex-NOR) circuits. The output of the first shift register 37 is commonly given to one input terminal of each Ex-NOR circuit. The outputs of the second shift register 38 are input to the other input terminals of the Ex-NOR circuits, respectively.

In the explanation of the principle in this case, the data of all bits of the second shift register 38 are checked for discrimination of the coincidence. However, in the embodiment of the invention, the coincidence is discriminated with respect to only two data of the bits at both ends of the second shift register 38 as will be explained hereinafter.

Figure 10B:
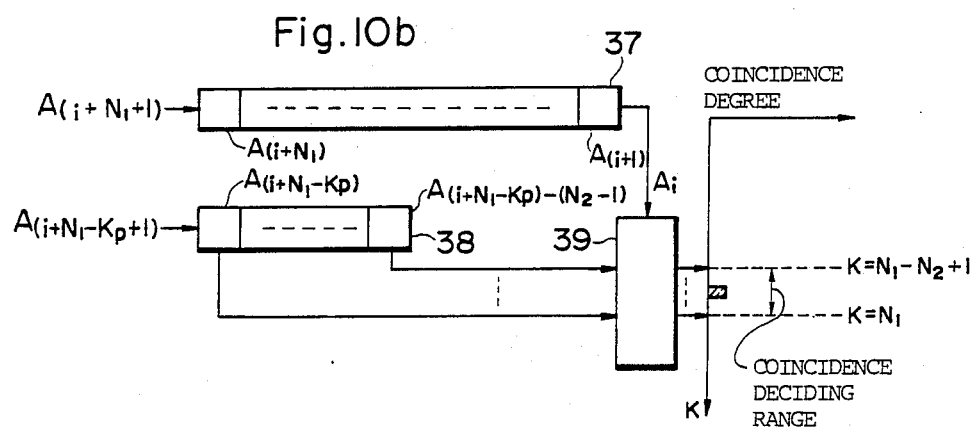

FIG. 10b shows the discriminating operation of the coindicence deciding section 39. The data $A_{i+1}$ to $A_{i+N_1}$ of the preceding signal are input to the first shift register 37. The data $A_{(i+N_1-K_p)-(N_2-1)}$ to $A_{i+N_1-K_p}$ of the delay signal are input to the second shift register 38. The data $A_i$ of the last bit regarding the serial output is input from the first shift register 37 to the condicence deciding section 39. The data $A_{(i+N_1-K_p)-(N_2-1)}$ to $A_{i+N_1-K_p}$ of all bits concerning with the parallel outputs are input from the second shift register 38 to the coincidence deciding section 39. The coincidence between those data contents is discriminated, respectively.

Figure 10C:
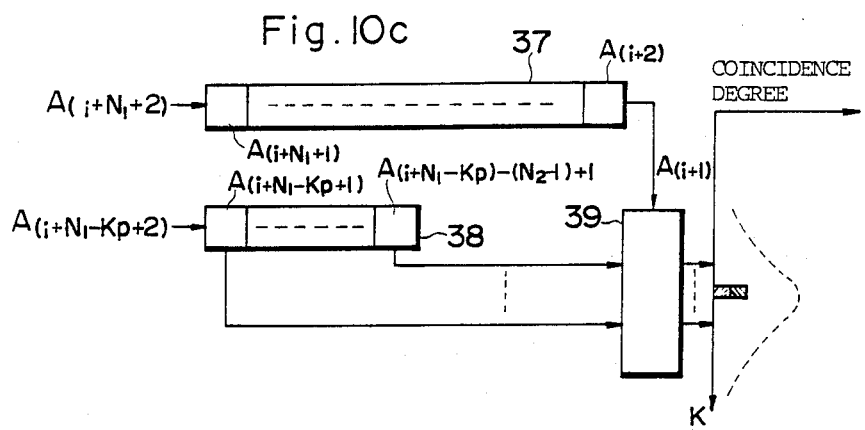

When one clock signal CK is given to the first and second shift registers 37 and 38, these shift registers perform the shifting operation by one bit and enter the state of FIG. 10c. The next serial output data $A_{i+1}$ is given from the first shift register 37 to the coincidence deciding section 39. The next parallel output data $A_{(i+N_1-K_p)-(N_2-1)+1}$ to $A_{i+N_1-K_p+1}$ are given from the second shift register 38 to the coindicence deciding section 39, respectively.

The $N_2$ results of the discrimination from the coincidence deciding section 39 are given to a group of counters including $N_2$ counters (corresponding to the counting sections 31 and 32). The coincidence degree regarding each bit of the second shift register 38 is counted by the counters, respectively.

In FIGS. 9, 10b and 10c, the results of the counting operations by the counters included in the counter group are shown on the orthogonal coordinates. In the orthogonal coordinates, an axis of abscissa indicates each bit position (corresponding to the time shift K) of the second shift register 38, that is, the $N_2$ counters arranged in a line, and an axis of ordinate represents the coincidence degree (correlation degree), i.e., the count values of the counters. Now, assuming that the data of the delay signal which is delayed by the time $\tau_d = K_p/f_{CK}$ from the data of the preceding signal coincides with that corresponding to the preceding signal coincides with that corresponding to the preceding signal, the coincidence degree (indicated as a hatched region in the diagrams) is accumulated at the position of $K_p$ within the range of K from $(N_1-N_2+1)$ to $N_1$.

Figure 11A:
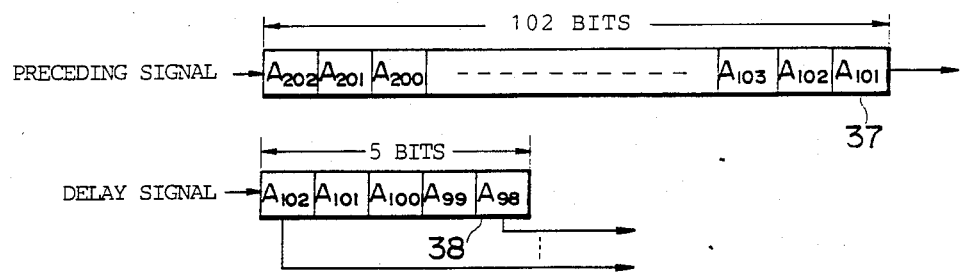
Figure 11B:
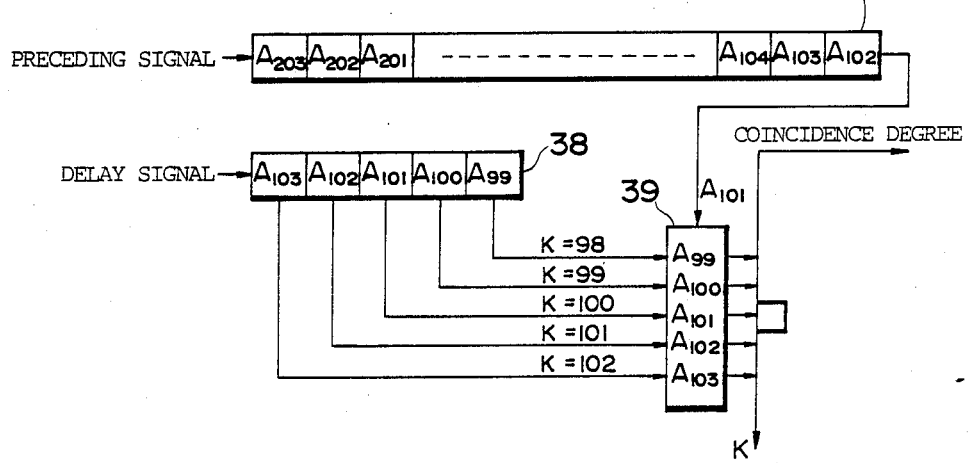
Figure 11C:
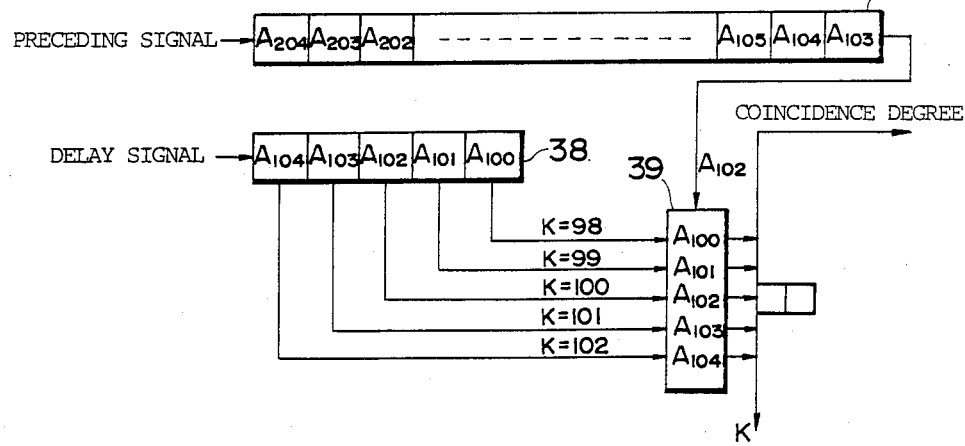

FIGS. 11a to 11c show an example of a practical arrangement of the first and second shift registers 37 and 38 and coincidence deciding section 39 and an example of the operations thereof.

In the case of this example, the frequency $f_{CK}$ of the clock signal CK is variably set such that the delay time $\tau_d$ of the delay signal for the preceding signal corresponds to the number $K_p$ of clock pulses ($K_p=100$). The preceding signal of 102 bits is stored into the first shift register 37. The delay signal of 5 bits is stored into the second shift register 38.

In FIG. 11a, the data $A_{101}$ to $A_{202}$ of 102 bits of the preceding signal are input to the first shift register 37. The data $A_{98}$ to $A_{102}$ of 5 bits of the delay signal are input to the second shift register 38.

When one clock signal CK is given to the first and second shift registers 37 and 38 and these shift registers perform the shifting operations by one bit, the shift registers 37 and 38 and coincidence deciding section 39 enter the states shown in FIG. 11b. Namely, the data $A_{102}$ to $A_{203}$ of the preceding signal are stored in the first shift register 37. The data $A_{99}$ to $A_{103}$ of the delay signal are held in the second shift register 38. The data $A_{101}$ of the last bit of the serial output is input from the first shift register 37 to the coincidence deciding section 39. The data $A_{99}$ to $A_{103}$ of all bits concerned with the parallel outputs are given from the second shift register 38 to the coincidence deciding section 39. The coincidence between those data is discriminated by the coincidence deciding section 39, respectively.

FIG. 11c shows a state in which the content of each of the shift registers 37 and 38 which are set into the state of FIG. 11b is further shifted by one bit. In this case, the coincidence deciding section 39 discriminates the coincidence between the next serial output data $A_{102}$ of the first shift register 37 and each of the next parallel output data $A_{100}$ to $A_{104}$ of the second shift register 38.

The coincidence degree with respect to each bit of the second shift register 38 is individually counted by each counter constituting the group of counters, respectively. In the case of this embodiment, since the delay time $\tau_d$ is set so as to correspond to the number $K_p$ of clock pulses ($K_p = 100$), as shown by the orthogonal coordinates in the diagram, the coincidence degree is theoretically accumulated to the position of K=100 and the correlation peak of the correlation curve appears.

Figure 12:
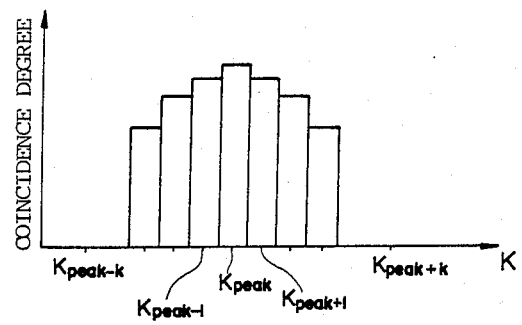
FIG. 12 is an explanatory diagram showing a correlation degree distribution.

FIG. 12 shows an example of the result of the counting by the counter group. This diagram shows that the coincidence degree of a certain degree also appears and is accumulated at the position other than the position $K_{peak}$ corresponding to $K=K_p$, so that a correlation degree distribution which spreads symmetrically on both sides around the position of $K_{peak}$ as a center is produced.

Figure 13:
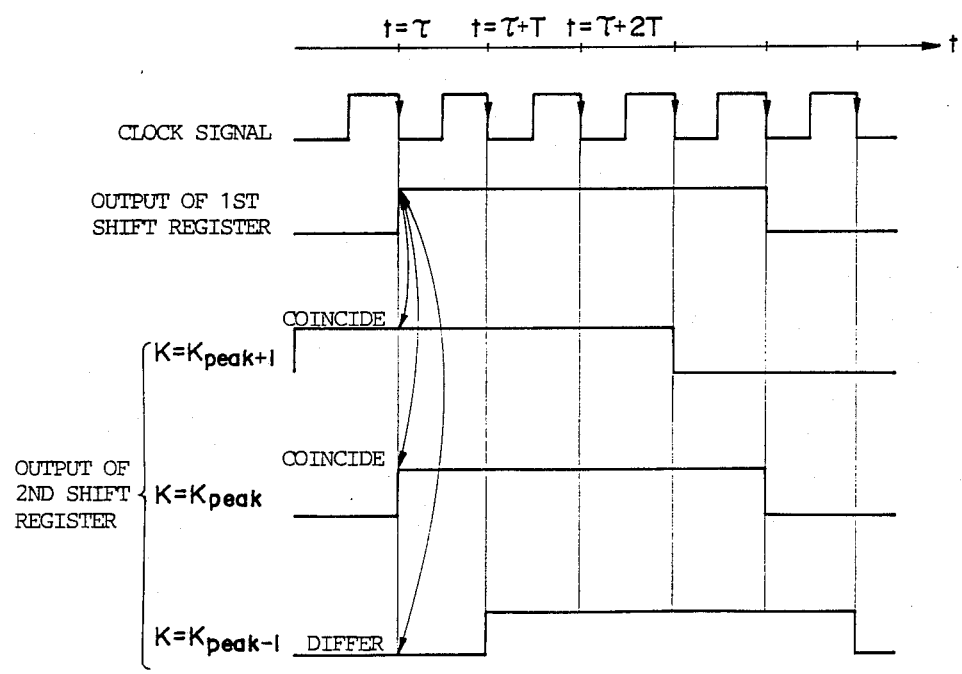
FIG. 13 is a time chart for explaining the production of the correlation degree distribution of FIG. 12.

The reason why such a distribution is obtained will be understood because as shown in FIG. 13, in the case where the bit data of the same data content (in the case of FIG. 13, the bit data at the high ("H") level) continues by a plurality of bits of the clock signal CK as an output of the first shift register 37, the output of the second shift register 38 also coincides with the data content not only at the position of $K = K_{peak}$ but also at the position of $K = K_{peak-1}$, so that the coincidence degree is also accumulated at the positions other than $K = K_{peak}$.

According to the embodiment, the correlation degree distribution almost symmetrically spreads on both sides around the position of $K_{peak}$ as a center, the correlation degrees at the symmetrical positions $K_{peak+1}$ and $K_{peak-k}$ are extracted and compared, and the frequency $f_{CK}$ of the clock signal CK is changed such that the correlation degrees at the positions of $K_{peak+k}$ and $K_{peak-k}$ coincide in accordance with the result of the comparison.

Figure 14:
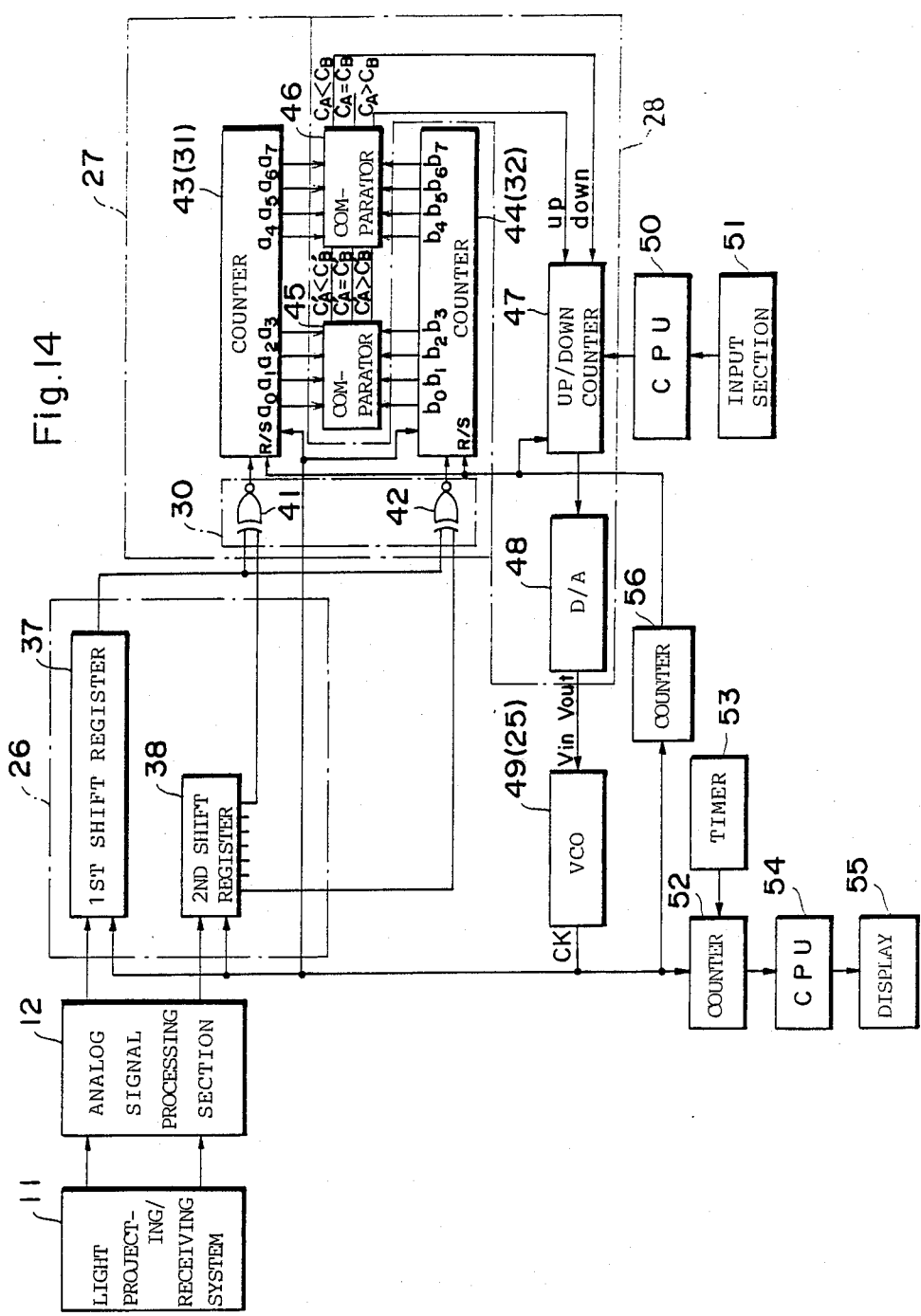
FIG. 14 is a block diagram showing an example of a circuit arrangement of the correlation processing section.

FIG. 14 shows an example of a practical arrangement of the correlation processing section 13 which has schematically been shown in FIG. 8 and whose principle has been described with reference to FIGS. 9 to 13.

In the embodiment shown in FIG. 14, since the correlation degrees are symmetrically distributed around the peak position as a center as mentioned above, only the data of two bits at both ends are extracted from the parallel outputs of the second shift register 38. Only the correlation degrees at the positions before and after $K_p$ corresponding to the delay time $\tau_d$, e.g., at the time positions of $K_{p+k}$ and $K_{p-k}$ are extracted.

In other words, the embodiment shown in FIG. 14 comprises: coincidence deciding circuits 41 and 42 for discriminating whether the data of the last bit regarding the serial output of the first shift register 37 and the data of the bits at both ends concerned with the parallel outputs of the second shift register 38 coincide or not, respectively; a pair of counters 43 and 44 to measure the results of the discriminations of the coincidence deciding circuits 41 and 42, namely, the coincidence degrees (correlation degrees); a pair of digital comparators 45 and 46 connected between the counters 43 and 44; an up/down counter 47 to which the results of the comparisons by the digital comparators 45 and 46 are given; and a voltage controlled oscillator (VCO) 49 to which a count value of the up/down counter 47 is given through a D/A converter 48. In this arrangement, the coincidence deciding circuits 41 and 42 correspond to the coincidence discriminating section 30 in FIG. 8. The counters 43 and 44 correspond to the counting sections 30 and 31, respectively. The digital comparators 45 and 46, up/down counter 47 and A/D converter 48 correspond to the clock control section 28. The VCO 48 corresponds to the variable clock generating section 25.

The digital comparators 45 and 46 compare the magnitudes of the count values (correlation degree) of the counters 43 and 44. The digital comparator 45 compares the magnitudes of the data of upper four bits. The other digital comparator 46 compares the magnitudes of the data of lower four bits. In FIG. 14, the count values of the counters 43 and 44 are represented by $C_A$ and $C_B$, respectively. The bit data of upper four bits of each count value are indicated by $a_0$ to $a_3$ and $b_0$ to $b_3$, respectively. The bit data of lower four bits are represented by $a_4$ to $a_7$ and $b_4$ to $b_7$, respectively.

The digital comparator 45 for comparison of upper bits compares the count data (indicated by $C_A'$ and $C_B'$ in the diagram) with respect to upper four bits and gives the results of the comparison to the digital comparator 46 for comparison of lower bits. When $C_A' > C_B'$, the digital comparator 46 for comparison of lower bits immediately decides that $C_A > C_B$. When $C_A' < C_B'$, the comparator 46 soon decides that $C_A < C_B$. However, when $C_A' = C_B'$, the comparator 46 compares the count data with respect to lower four bits, thereby discriminating the magnitudes of the count values.

The digital comparator 46 supplies an output corresponding to the result of the comparison to the up/down counter 47. When $C_A > C_B$, the comparator 46 outputs a signal to count up the count value of the counter 47. When $C_A < C_B$, the comparator 46 outputs a signal to count down the count value of the counter 47.

Initial data $N_0$ calculated by a CPU 50 is first preset in the up/down counter 47. The initial data $N_0$ gives the frequency $f_{CK}$ of the clock signal CK such that the delay time $\tau_d$ corresponds to the constant value $K_p (=100)$ as the number of clocks. The velocity V ($=r\omega$) is obtained from the angular velocity $\omega$ of each of the rollers $R_{A1}$, $R_{A2}$ and $R_{A3}$ and this velocity v is input to an input section 51. Thus, the CPU 50 executes predetermined arithmetic operations and calculates the initial data $N_0$ by assuming that the sensitivity [Hz/V] of the voltage controlled oscillator 49 and the voltage resolution

[V/LSB] of the D/A converter 48 have already been known.

Figure 15:
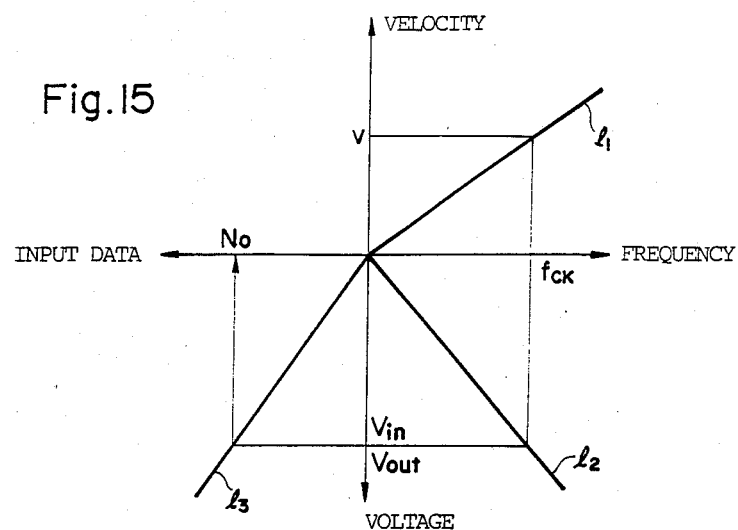
FIG. 15 is an explanatory diagram showing an initializing method of the correlation processing section.

FIG. 15 shows the relation between the velocity v for initialization and the initial data $N_0$. In the diagram, a straight line $l_1$ shows the relation between the velocity v and the frequency $f_{CK}$ of the clock signal CK. Assuming that the interval between the photo sensing devices 19 and 20 in the light projecting/receiving system 11 is $X_d$, a speckle translational magnification is $\sigma$, and the number of clock pulses corresponding to the delay time $\tau_d$ is $K_p$, the velocity v is given by the following equation.

$$v = \frac{X_d}{\sigma} \cdot \frac{1}{K_p} \cdot f_{CK} \qquad (2)$$

A straight line $l_2$ shows the relation between an input voltage $V_{in}$ of the VCO 49 and the frequency $f_{CK}$ of the clock signal CK and corresponds to the sensitivity characteristic of the VCO 49.

A straight line $l_3$ indicates the relation between the input data of the D/A converter 48 and its output voltage $V_{out}$ and corresponds to the voltage resolution of the D/A converter 48.

Now, assuming that the sensitivity of the VCO 49 is X [Hz/V] and the voltage resolution of the D/A converter 48 is Y [V/LSB], $$f_{CK} = X \cdot Y \cdot N_0 \qquad (3)$$

Therefore, the CPU 50 calculates the initial data $N_0$ by calculating the following equation.

$$N_0 = \frac{f_{CK}}{X \cdot Y} = \frac{\frac{\sigma}{X_d} \cdot K_p}{X \cdot Y} \cdot v \qquad (4)$$

First, the VCO 49 determines the frequency $f_{CK}$ of the clock signal CK on the basis of the initial data $N_0$ and outputs. The correlation processing section 13 executes the correlating process at the timing of the clock signal CK. When the velocity $v_1$ of the object OB shown in FIG. 4 differs from the initial value v, the correlation peak does not exist at the position of $K_p$ but is located at the position which is deviated to the left or right. In this case, the count values (correlation degrees) $C_A$ and $C_B$ of the counters 43 and 44 do not coincide. In accordance with the relation between the magnitudes of them, the digital comparator 46 allows the up/down counter 47 to count up or down the count value. Thus, the frequency $f_{CK}$ of the clock signal CK is adjusted so as to make the correlation degrees coincide. In FIG. 14, a counter 56 is provided to count the clock signals CK and resets and starts the counters 43 and 44 for measurement of the coincidence degree when the count value becomes a predetermined value.

Figure 16:
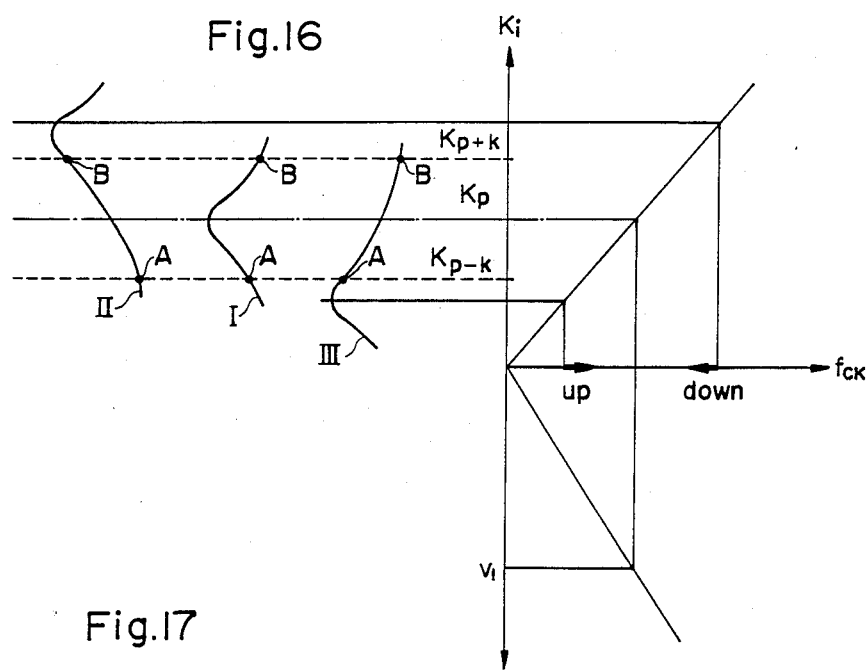
FIG. 16 is an explanatory diagram showing the control principle of a clock frequency.

FIG. 16 shows the adjusting principle of the frequency $f_{CK}$. In the diagram, I indicates a correlation degree distribution when the correlation degrees $C_A$ and $C_B$ coincide, II denotes a correlation degree distribution when $C_A < C_B$, and III represents a correlation degree distribution when $C_A > C_B$, respectively.

It will be understood from FIG. 16 that in the case of II where $C_A > C_B$, the frequency $f_{CK}$ of the clock signal CK is adjusted so as to be reduced and that in the case of III where $C_A > C_B$, the frequency $f_{CK}$ of the clock signal CK is adjusted so as to be increased.

In this manner, the frequency $f_{CK}$ of the clock signal CK is adjusted so as to obtain the state of I in which $C_A = C_B$. The calculating section 29 calculates and obtains the velocity $v_1$ of the object OB from the frequency $f_{CK}$ in this balanced state.

In the case of the embodiment of FIG. 14, the calculating section 29 in FIG. 8 comprises: a counter 52; a timer 53; a CPU 54; and a display section 55. The number of clock pulses per unit time (corresponding to the frequency $f_{CK}$) which is measured by the timer 53 is counted by the counter 52. The CPU 54 takes in the result of the counting and executes and next arithmetic operation, thereby obtaining the velocity $v_1$ and displaying it by the display section 55.

$$v_1 = \frac{X_d}{\sigma} \cdot \frac{1}{K_p} \cdot f_{CK} \qquad (5)$$

Figure 17:
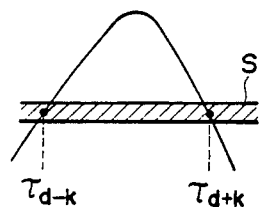
FIG. 17 is an explanatory diagram showing an example of a method of discriminating the coincidence of a correlation degree.

In the discrimination of the coincidence between the correlation degrees $C_A$ and $C_B$, it is considered that it is a rare case where they perfectly coincide. Therefore, as shown in FIG. 17, it is practically desirable to set a range S (shown by a hatched region) of the degrees which can be regarded to be coincident.

In the embodiment, only the velocity $v_1$ of the object OB has been measured. However, for example, by use of a counter and a comparator, pulses of a constant length are generated when the clock pulses of the number corresponding to the unit length of the object OB are counted, the total number of pulses of the constant length is counted, and the length (moving distance) of the object OB can be also calculated in this manner.

The operation of the embodiment will now be described.

When the laser beam is irradiated onto the moving object OB, a speckle pattern is produced by the reflected light from the surface of the object OB and the speckle signal is detected by the first and second photo sensing devices 19 and 20. The photo sensing signals are given to the analog signal processing section 12 and binarized. The binary outputs are given to the correlation processing section 13 as a preceding signal and a delay signal.

In the correlation processing section 13, the variable clock generating section 25 determines the clock frequency $f_{CK}$ and gives the clock signal CK to the delay generating section 26. The shift registers 37 and 38 in the delay generating section 26 take in the preceding signal and delay signal at the timing of the clock signal CK. The first shift register 37 gives the last bit data regarding the serial output and the second shift register 38 gives the bit data at both ends concerned with the parallel outputs to the coincidence deciding circuits 41 and 42, respectively. Each of the coincidence deciding circuits 41 and 42 discriminates the coincidence between those data contents. The coincidence degrees $C_A$ and $C_B$ are counted by the counters 43 and 44. The coincidence degrees $C_A$ and $C_B$ obtained by the counters 43 and 44 are input to the digital comparators 45 and 46 and compared. In accordance with the result of the comparison, the up/down counter 47 counts up or down the count value so that $C_A$ is equal to $C_B$. The count value of the up/down counter 47 is supplied to the VCO 49 in the variable clock generating section 25 through the D/A converter 48. The oscillator 49 determines the clock frequency $f_{CK}$ in accordance with the input voltage and generates the clock signal CK. The frequency $f_{CK}$ of the clock signal CK when the coincidence degrees $C_A$ and $C_B$ coincide represents the velocity of the object OB. The counter 52 counts the number of clocks per unit time. The CPU 54 takes in the result of the counting and executes predetermined arithmetic operations. Thus, the velocity $v_1$ of the object OB is obtained.

Figure 18:
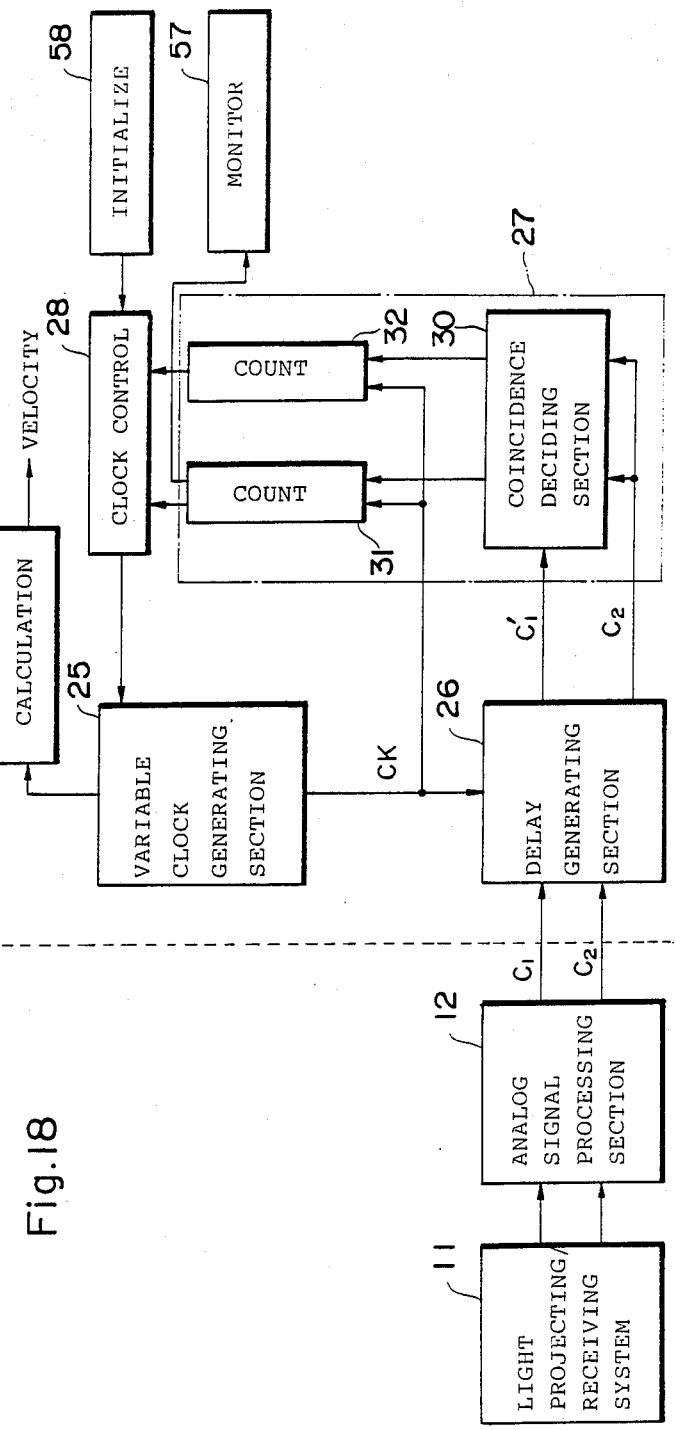
FIGS. 18 to 21 show a modification.
Figure 19:
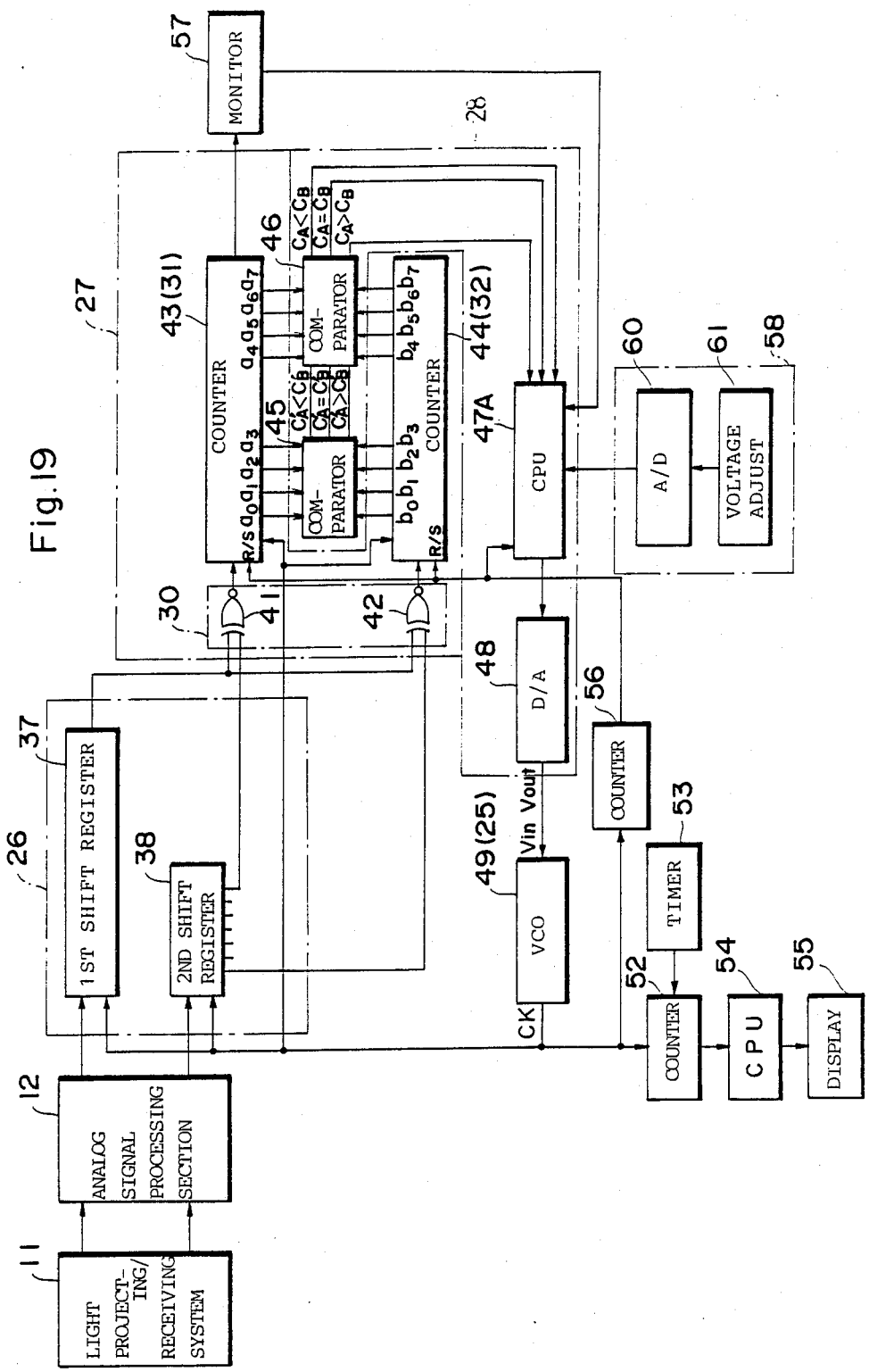

FIGS. 18 to 21 show a modification. FIG. 18 corresponds to FIG. 8. FIG. 19 corresponds to FIG. 14. In these diagrams, the same parts and components as those shown in FIGS. 8 and 14 are designated by the same reference numerals and their descriptions are omitted.

In FIG. 18, a monitor section 57 and an initializing section 58 are included in the correlation processing section 13. The monitor section 57 monitors the correlation degree obtained in the correlating section 27. The initializing section 58 forcedly changes the frequency $f_{CK}$ of the clock signal CK for the variable clock generating section 25, thereby performing the initialization.

In FIG. 19, a CPU 47A is provided in place of the foregoing up/down counter 47. The CPU 47A performs the same operation as that of the up/down counter 47. That is, when the result of the comparison by the comparator 46 is $C_A > C_B$, the CPU 47A increases the output to the D/A converter 48 (i.e., the input of the D/A converter 48). When $C_A < C_B$, the CPU 47A decreases the output. As already described with reference to FIG. 16, such an automatic control of the frequency $f_{CK}$ of the clock signal CK is executed when the count values (coincidence degrees) of the counters 43 and 44 are near the peak value of the correlation degree distribution. In many cases, this state corresponds to the case where the velocity of the object OB has already approximately been known and this velocity is initialized.

In this embodiment, the initializing section 58 is designed such that the invention can be also applied to the case where the velocity to be initialized is not known at all. The search of the velocity data to be initialized is referred to as an initial data search.

The initial data which is set by the initializing section 58 is first given to the CPU 47A. In the case of the example shown in the diagram, the initializing section 58 includes a voltage adjusting section 61 whose output voltage can be manually adjusted and A/D coinverter 60 to convert the output voltage of the voltage adjusting section 61 to the digital value. When the initial data is searched, the CPU 47A gives the output voltage of the A/D converter 60 to the oscillator 49 through the D/A converter 48, thereby changing the frequency $f_{CK}$ of the clock signal CK.

Figure 20:
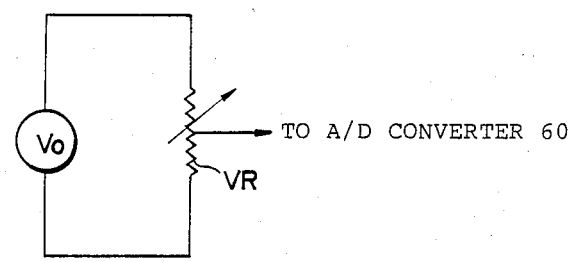

FIG. 20 shows an example of the voltage adjusting section 61. A variable resistor VR is connected to a reference voltage $V_0$. The output voltage of the variable resistor VR can be freely changed by rotating it. Thus, the frequency $f_{CK}$ of the clock signal CK is forcedly changed and the initial data can be searched.

The correlation degree counted by the counter 43 (or 44) during the searching operation can be monitored by the monitor section 57. When the frequency $f_{CK}$ of the clock signal CK is changed by rotating the variable resistor VR, the monitor section 57 functions so as to check whether or not the frequency $f_{CK}$ has reached the range where the automatic control can be performed.

Figure 21:
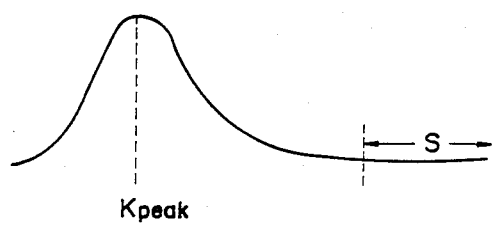

FIG. 21 shows a flat region S where the automatic control of the clock frequency $f_{CK}$ in the correlation degree distribution (this control is referred to as a balance detection) cannot be executed. If the count value (correlation degree) of the counter 43 lies in the flat region S which is sufficiently away from the position $K_{peak}$ of the correlation peak, the balance detection cannot be performed.

In the case of the embodiment, a discrimination regarding whether the balance detection can be performed or not is made by checking to see if the count value (correlation degree) of the counter 43 has reached a predetermined value or not. When the count value has reached the predetermined value, an LED or the like in the monitor section 57 is lit on for confirmation by the eyes and at the same time, a signal to activate the clock control section 28 is output to the CPU 47A. When the CPU 47A receives this activation signal, the initialization is completed and thereafter, the input from the initializing section 58 is stopped. The input from the digital comparator 46 is accepted. The control mode of the CPU 47A is switched to the automatic control mode of the clock frequency $f_{CK}$.

When the frequency $f_{CK}$ of the clock signal CK is initialized to a proper range, the correlation processing section 13 executes the correlating processes mentioned above. In these processes, if the count values $C_A$ and $C_B$ of the counters 43 and 44 differ, the digital comparator 46 outputs the signal indicative of the relation between the magnitudes of those count values to the CPU 47A. On the basis of this signal, the CPU 47A adjusts the frequency $f_{CK}$ of the clock signal CK so as to make the correlation degrees coincide as already explained above.

FIGS. 22 to 26 show another embodiment. In the foregoing embodiment, the balance detection of the correlation degrees has been performed by using two bits of data located at both ends of the second shift register 38 among the data train of the delay signal from the second photo sensing device 20 which are held in the second shift register 38. However, as described with reference to FIGS. 9, 10a to 10c, and 11a to 11c, it is desirable to obtain the correlation degree distribution by use of all of the bit data. In this embodiment, the correlation degree distribution is derived using all of the data in the second shift register 38 and the frequency $f_{CK}$ of the clock signal CK is controlled on the basis of the peak position of this distribution.

Figure 22:
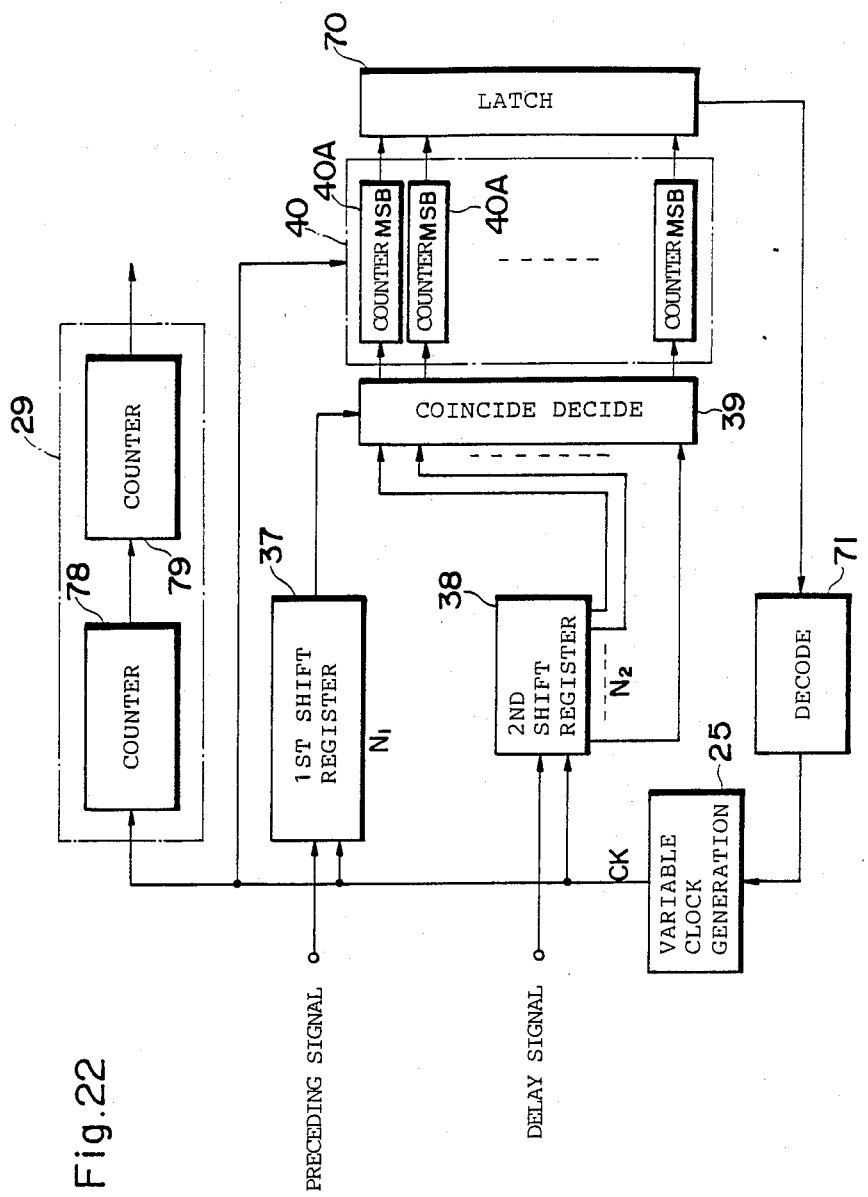
FIGS. 22 to 26 show another embodiment.

In FIG. 22, the same or similar parts and components as those shown in FIGS. 8, 9, 14 and the like are designated by the same reference numerals as mush as possible. In FIG. 22, it is assumed that the number $N_1$ of bits of the first shift register 37 is $N_1 = 102$ and the number $N_2$ of bits of the second shift register 38 is $N_2 = 6$. As mentioned before, the coincidence deciding section 39 comprises $N_2$ Ex-NOR circuits. A counter group 40 has $N_2$ counters 40A and counts the coincidence detection signals of the corresponding Ex-NOR circuits. A latch section 70 is connected to the counter group 40. The latch section 70 comprises latch circuits of $N_2$ bits. When either one of the count values of the counters 40A of the counter group 40 is equal to a predetermined maximum value (the peak value of the correlation degrees), the latch section 70 latches the content of the most significant bit (MSB) of each counter 40A and outputs the bit pattern code to a decoding section 71.

Figure 23:
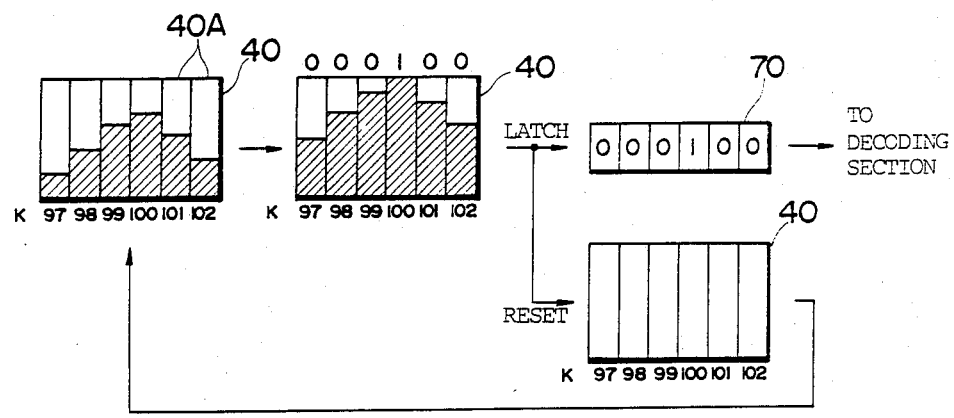

FIG. 23 shows the transition of the operations of the counter group 40 and latch section 70. The hatched portion of the counter group 40 on the leftmost end in the diagram indicates the count content of the counter group 40 at a certain time point, i.e., the coincidence degree distribution. At this time point, all of the count values of the counters 40A do not reach the maximum value (i.e., the MSB is set to 1). After the elapse of a predetermined time from this state, the count values of the counter group 40 become as shown at the center in the diagram. At this time point, the count value of the counter 40A at the position of K=100 has reached the predetermined maximum value, namely, the MSB of the counter is set to "1". The last bit (MSB) of the counter 40A in this state is such that only the counter at the position of K=100 is set to "1" and the counters at the other positions set to "0".

When either one of the counters is filled up, the contents of the last bits of all of the counters 40A are contents of the last bits of all of the counters 40A are latched by the latch section 70 and converted into a bit pattern code. At the same time, the counters 40A of the counter group 40 are reset for preparation of the next counting operation.

Therefore, the correlation peak can be detected from the bit pattern code latched in the latch section 70. The delay time $\tau_d$ can be calculated on the basis of the position of the correlation peak and the period T ($=1/f_{CK}$) of the clock signal CK at this time. The coincidence deciding section 39, counter group 40, and latch section 70 constitute a peak detecting section.

Figure 24:
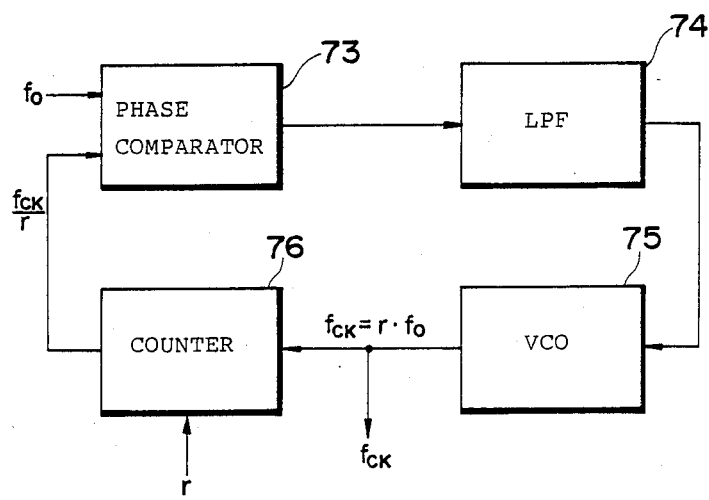

FIG. 24 shows an example of an arrangement of the variable clock generating section 25. This generating section variably sets the clock frequency $f_{CK}$ and generates the clock signal CK in a manner such that the delay time $\tau_d$ corresponds to the constant value $K_p$ (e.g., 100) as the number of clock pulses. In the case of the example shown in the diagram, the variable clock generating section 25 comprises a PLL (phase locked loop) consisting of a phase comparator 73, a low pass filter 74, a voltage controlled oscillator (VCO) 75, and a counter 76.

A reference signal of a reference frequency $f_0$ is given to the phase comparator 73. A frequency dividing ratio r is given to the counter 76. The variable clock generating section 25 varies the multiplication magnification of the reference frequency $f_0$ by the frequency dividing ratio r, thereby changing the clock frequency $f_{CK}$ ($=r.f_0$).

In the above arrangement, the counter 76 divides the frequency of clock signal CK by the frequency dividing ratio r and gives the frequency-divided clock signal to the phase comparator 73. The phase comparator 73 compares the phase of the signal having a frequency $f_{CK}/r$ which is output from the counter 76 with the phase of the reference signal having the reference frequency $f_0$ and generates the voltage corresponding to the phase difference. The low pass filter 74 smoothes the input signal from the phase comparator 73 and gives it to the voltage controlled oscillator 75. The oscillator 75 generates the clock signal CK of the frequency $f_{CK}$ ($=r.f_0$) corresponding to the level of the input voltage.

Figure 25:
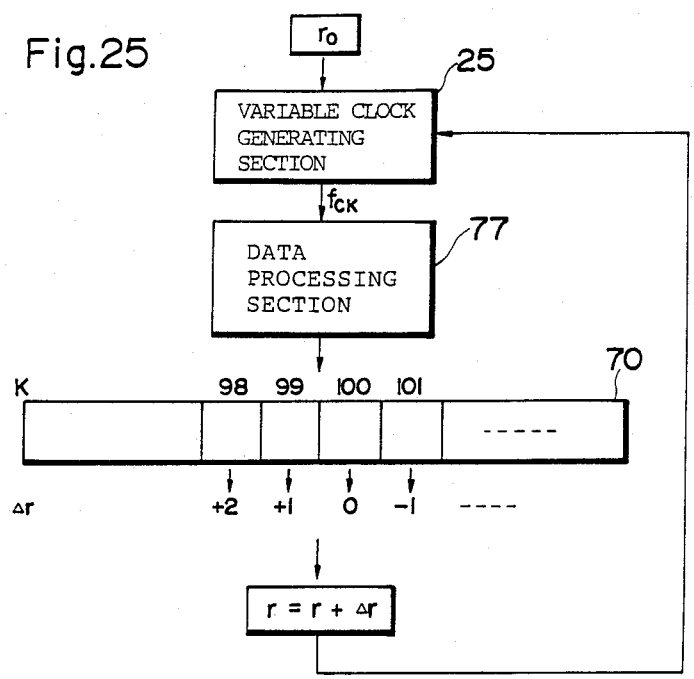

FIG. 25 shows a method of deciding the frequency dividing ratio r.

In the diagram, $r_0$ denotes an initial frequency dividing ratio which is given as initial data to the variable clock generating section 25. On the basis of the initial frequency dividing ratio $r_0$, the variable clock generating section 25 determines the clock frequency $f_{CK}$ at the initial stage. After that, the generating section 25 decides the clock frequency $f_{CK}$ on the basis of the updated frequency dividing ratio r. The clock signal CK is input to a data processing section 77. The data processing section 77 corresponds to the first and second registers 37 and 38, coincidence deciding section 39, counter group 40 and the like. The coincidence degree distribution obtained by the counting operations of the counter group 40 is latched into the latch section 70 and a bit pattern is obtained. This bit pattern is decoded by the decoding section 71 and a control amount $\Delta r$ of the frequency dividing ratio r is assigned in accordance with the decoded content. In the example shown in the diagram, for example, a pattern such that the position of K=99 is set to "1" in the bit pattern obtained by the latch section 70 is assumed. In this case +1 is assigned as the control amount $\Delta r$. By adding the control amount $\Delta r$ to the preceding frequency dividing ratio r, the ratio r is newly updated. By giving this updated frequency dividing ratio r to the variable clock generating section 25, the clock frequency $f_{CK}$ based on this ratio r is determined and the clock signal CK of this clock frequency is output.

Returning to FIG. 22, the clock signal CK is given to the calculating section 29 having two counters 78 and 79. The calculating section 29 calculates the length and velocity of the object OB by counting the clock signals CK. The first counter 78 outputs a pulse signal of a predetermined constant length when the count value of the clock signals CK reaches a reference count value $N_s$ corresponding to the unit length $l_0$ of the object OB. The second counter 79 counts the number of pulse signals of the predetermined constant length. Assuming that the total number of output pulses is N, the length (moving distance) L of the object OB can be obtained by the following equation (6).

$$L = l_0 \times N \qquad (6)$$

On the other hand, by counting the number N' of output pulses per unit time by the second counter 79, the velocity $v_1$ of the object OB can be obtained by the following equation (7).

$$v_1 = l_0 \times N' \qquad (7)$$

In this case, it will be appreciated that a timer is provided to set the counting time of the second counter 79.

Figure 26:
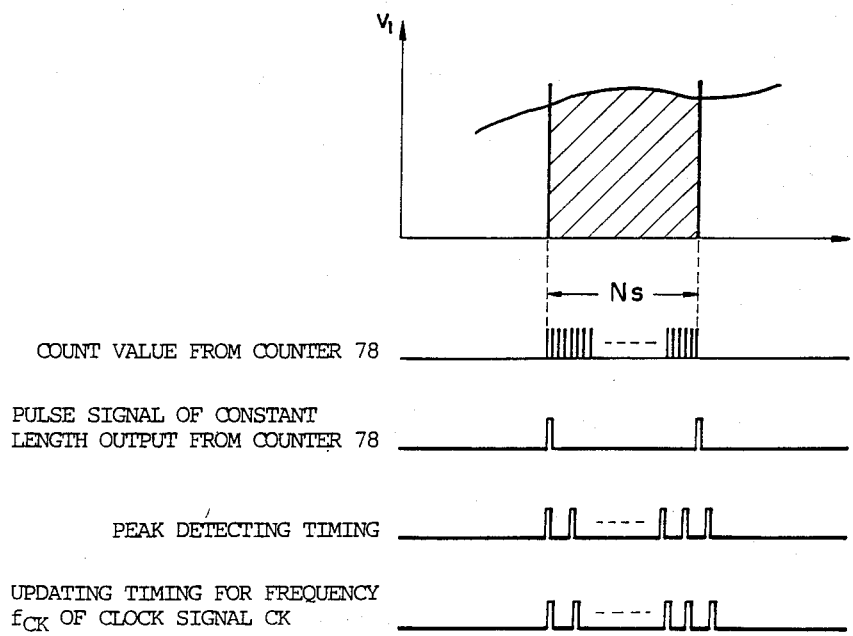

FIG. 26 shows the state in which the velocity $v_1$ of the moving object OB changes. In the diagram, an axis of abscissa denotes the time t and an axis of ordinate indicates the velocity $v_1$ of the object OB. The area of the hatched region corresponds to the moving distance (length) $l_0$ of the object OB for a certain period of time. This diagram also shows the count value $N_s$ of the clock signals CK which are counted by the first counter 78 for the certain period of time, the pulse signal of the predetermined length which is output from the first counter 78, the peak detecting timing by the peak detecting section, and the updating timing of the frequency $f_{CK}$ of the clock signal CK, respectively. These timings are asynchronous with the output timing of the first counter 78.

Figure 27:
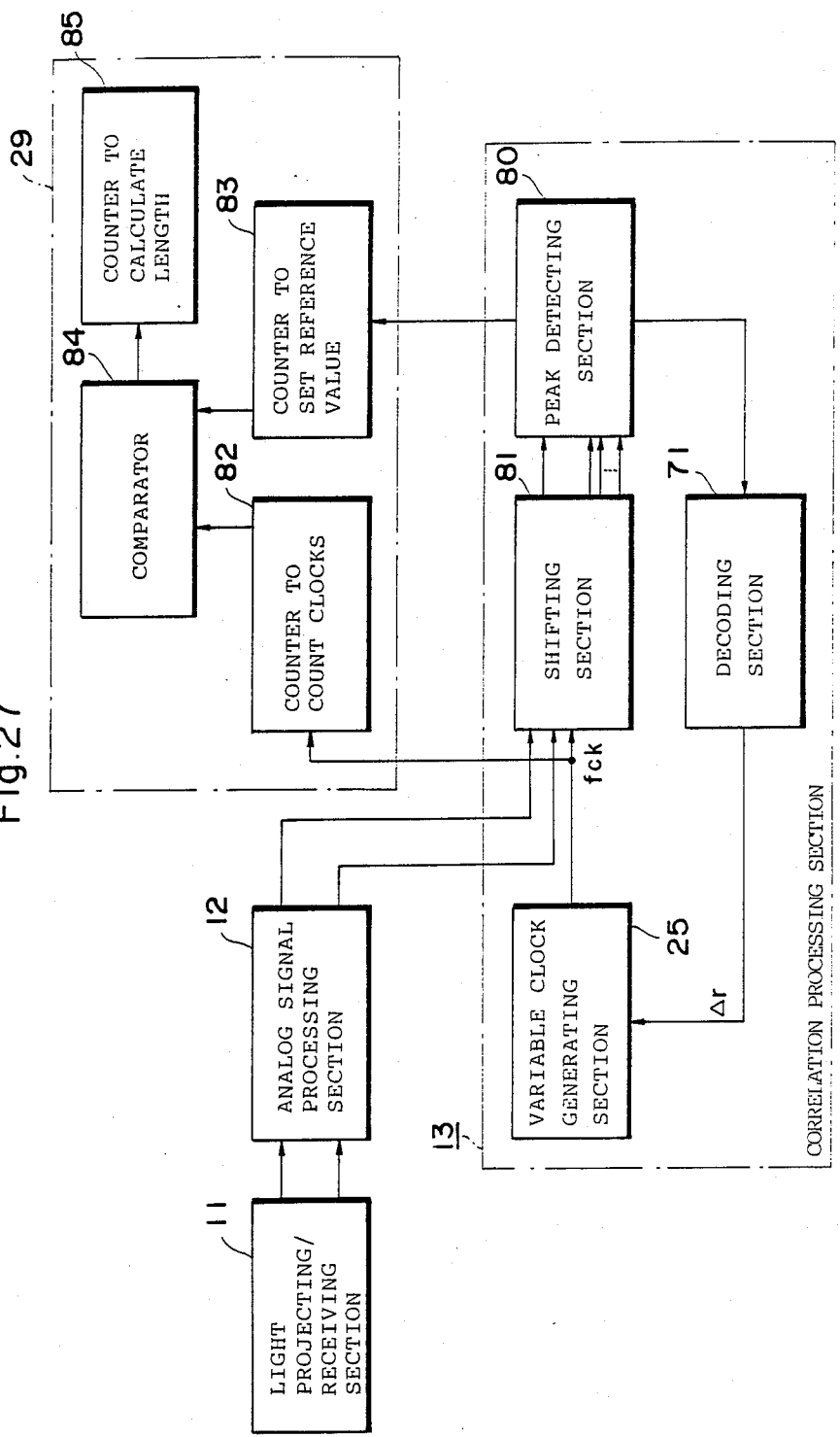
Figure 28:
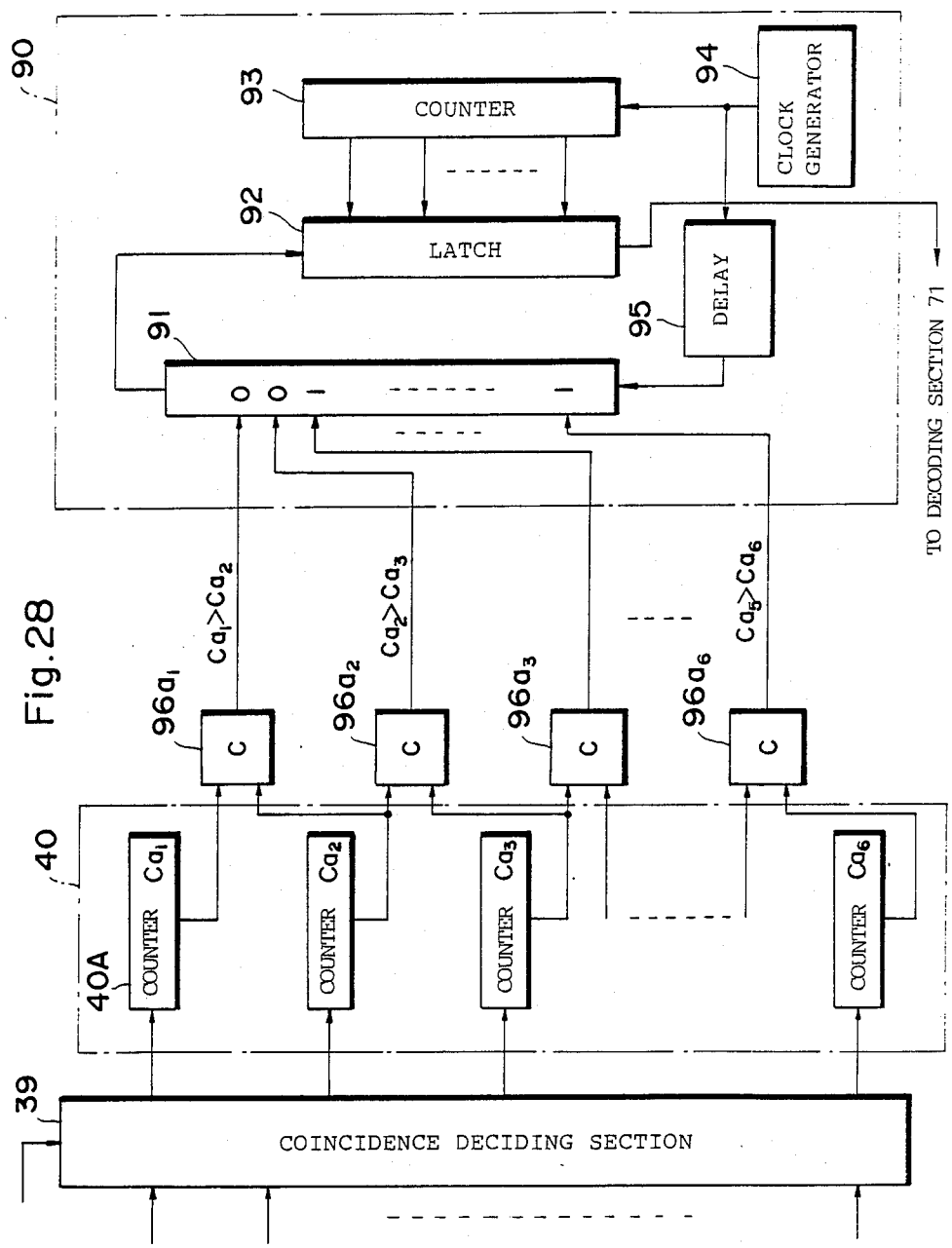

FIGS. 27 to 29 shows further another embodiment of the invention.

In FIG. 27, a shifting section 81 includes the first and second shift registers 37 and 38 in comparison with FIG. 22. A peak detecting section 80 corresponds to the peak detecting section consisting of the coincidence deciding section 39, counter group 40 and latch section 70. As will be explained hereinlater with reference to FIG. 28, the practical arrangement of the peak detecting section 80 differs from that shown in FIG. 22. The practical constitution of the calculating section 29 in FIG. 27 differs from that of the calculating section 29 in FIG. 22.

FIG. 28 shows an example of a practical constitution of the peak detecting section 80 in FIG. 27 and comprises: the same coincidence deciding section 39 as that shown in FIG. 22; the same counter group 40 consisting of a plurality of counters 40A as that shown in FIG. 22; a plurality of digital comparators $96a_1$ to $96a_6$ connected between the counters of the adjacent bits; and a data producing section 90 to which special outputs of the digital comparators $96a_1$ to $96a_6$ are given.

Each of those digital comparators compares the magnitudes of the count values of the counters 40A of the adjacent bits. Assuming that the count values of $N_2$ (=6) counters 40A are set to $Ca_1, Ca_2, \ldots, Ca_6$, the comparator $96a_1$ outputs the "1" signal when $Ca_1 > Ca_2$. The comparator $96a_2$ outputs the "1" signal when $Ca_2 > Ca_3$. In this manner, the comparator $Ca_i$ outputs the "1" signal when $Ca_i > Ca_{(i+1)}$. Therefore, in the data array of the detection data of those comparators which are input to the data producing section 90, by detecting the switching position from "0" to "1", the position of the correlation peak can be detected.

The data producing section 90 includes not only a shift register 91 to which the output signals of the comparators are given in parallel but also a latch section 92, a counter 93, a clock generator 94, and a delay circuit 95.

A clock signal is supplied from the clock generator 94 to the shift register 91 and counter 93. The counter 93 counts the clock pulses. The shift register 91 serially outputs the bit data with a slight delay time from the clock timing. When the bit data of "1" is given from the shift register 91 to the latch section 92, the latch section 92 latches the count value of the counter 93 at this time. On the basis of this latched data, it is possible to determine from the count value which number counter among the counters 40A is the maximum. Thus, the position of the correlation peak is specified. The delay time $\tau_d$ can be calculated from the position of the correlation peak and the period $T (=1/f_{CK})$ of the clock signal CK at this time.

The constitution of the variable clock generating section 25 and the control of the frequency $f_{CK}$ of the clock signal CK based on the detection correlation peak are substantially the same as those described and shown in FIGS. 24 and 25.

Returning to FIG. 27, the clock signal CK is given to the calculating section 29. The calculating section 29 obtains the length and velocity of the moving object OB by counting the clock pulse signals CK and comprises: a counter 82 to count clocks; a counter 83 to set a reference value; a comparator 84; and a counter 85 to calculate the length.

The clock counting counter 82 counts the clock signals CK which are generated from the variable clock generating section 25.

The reference value setting counter 83 presets the number of clock pulses corresponding to the unit length $l_0$ of the moving object OB as a reference count value $n_0$. This preset value is determined every time in accordance with the position of the correlation peak detected by the peak detecting section 80. It is arranged that the peak detecting section 80 detects the correlation peak position when the count value $N_s$ of the clock pulse counting counter 82 reaches a predetermined value $N_p$ ($N_p < n_0$).

When the count value $N_s$ of the counter 82 reaches the reference count value $n_0$ preset in the counter 83, the comparator 84 outputs a pulse signal of a predetermined constant length. Simultaneously with the generation of this pulse signal of the predetermined length, the counter 83 and the counter group 40 in the peak detecting section 27 are reset.

The length calculating counter 85 counts the pulse signals of the predetermined length. Assuming that the total number of pulses is N, the length (moving distance) L of the moving object OB can be calculated by the foregoing equation (6).

By counting the number $N'$ of output pulses per unit time by the counter 85, the velocity $v_1$ of the object OB can be derived by the foregoing equation (7).

FIG. 29 shows the state in which the velocity $v_1$ of the moving object OB changes. In the diagram, an axis of abscissa denotes the time t and an axis of ordinate represents the velocity $v_1$ of the object OB.

In the diagram, the area of the hatched region corresponds to the moving distance (length) $l_0$ of the object OB for a predetermined period of time $t_0$. FIG. 29 also shows the counting operation of the clock signals CK by the clock pulse counting counter 82, preset timing of the reference value setting counter 83, output timing of the pulse signal of the predetermined constant length regarding the output of the comparator 84, peak detecting timing by the peak detecting section 80, and updating timing of the frequency $f_{CK}$ of the clock signal CK, respectively.

What is claimed is:

1. A laser speckle velocity-measuring apparatus comprising:

light projecting means for irradiating a light to a moving object;

first and second photo sensing devices with light receiving points arranged at a predetermined distance so as to be away from each other in order to receive a scattered light from a surface of said object, said first photo sensing device outputting a preceding signal and said second photo sensing device outputting a delay signal;

variable clock signal generating means for generating a variable frequency clock signal;

first means for sampling said preceding signal at a rate determined by the clock signal to form first sampled data, and for shifting the first sampled data by predetermined stages, each stage corresponding to one period of the clock signal;

second means for sampling said delay signal at a rate determined by the clock signal to form second sampled data, and for holding a plurality of said second sampled data;

means for comparing the first sampled data output from said first means with each of the plurality of the second sampled data which are held by said second means, and for making data representing a correlation degree distribution relating said preceding signal and delay signal;

clock signal control means for changing the frequency of the clock signal to control a delay time in said first means such that the first sampled data which was shifted by specified stages in said first means indicates a maximum value of said correlation degree distribution; and arithmetic operating means for calculating a length, a moving distance or a velocity of the object from the frequency of the clock signal and the distance between the light receiving points of said first and second photo sensing devices.

2. An apparatus according to claim 1, wherein the light receiving points of the first and second photo sensing devices are arranged along a moving direction of said moving object at a predetermined distance so as to be away from each other.

3. An apparatus according to claim 1, wherein said light projecting means comprises a semiconductor laser.

4. An apparatus according to claim 1, wherein said variable clock generating means is a voltage controlled oscillator to generate a clock signal of the frequency in response to the level of the input voltage.

5. An apparatus according to claim 1, wherein said clock signal control means comprises:

delay means comprising first and second shift registers to individually serially receive a preceding signal and a delay signal from said photo sensing devices;

correlation degree distribution making means comprising a pair of coincidence deciding circuits for individually comparing the data of a last bit of a serial output of the first shift register with the data of bits at both ends of a parallel output of the second shift register, and thereby for discriminating whether contents of the data compared coincide, and a pair of counters for respectively counting the correlation degree on the basis of outputs from said coincidence deciding circuits; and clock control means for changing the frequency of the clock signal to control said delay time such that count values of said counters are equal to each other.

6. An apparatus according to claim 5, wherein said clock control means comprises:

a digital comparator for comparing the correlation degrees counted by said pair of counters;

an up/down counter having a count output responsive to the digital comparator; and a D/A converter for converting the count output into an analog signal and giving the analog signal to said variable clock generating means.

7. An apparatus according to claim 5, further having monitor means for monitoring the correlation degree obtained by said correlation degree distribution making means, and initializing means for forcedly changing the frequency of an clock signal for said variable clock generating means, thereby performing the initialization.

8. An apparatus according to claim 7, wherein said clock control means comprises:

a digital comparator for comparing the correlation degrees counted by said pair of counters;

a CPU for changing the level of its output on the basis of the result of the comparison of the comparator; and a D/A converter for converting the output of said CPU into an analog signal and giving the analog signal to said variable clock generating means.

9. An apparatus according to claim 7, wherein said monitor means outputs a signal to activate the clock control means when the correlation degree reaches a predetermined value.

10. An apparatus according to claim 7, wherein said initializing means includes a voltage adjusting means to manually adjust an output voltage and an A/D converter to convert the output voltage of said voltage adjusting means into a digital signal,,,, and said initializing means having means for changing the frequency of the clock signal for the variable clock generating means on the basis of an output of said A/D converter, thereby performing the initialization.

11. An apparatus according to claim 1, wherein said arithmetic operating means includes a first counter to output pulse signals of a predetermined length when the count value reaches a reference count value corresponding to a unit length and a second counter to obtain a length or a velocity of the object by counting said pulse signals of the predetermined length.

12. An apparatus according to claim 1, wherein said arithmetic operating means comprises:

clock counting means for counting the clock signals;

peak detecting means for detecting a correlation peak at a timing of an arbitrary clock with respect to the photo sensing signals from said first and second photo sensing devices;

reference value setting means for setting a number of clock pulses corresponding to a predetermined length of the moving object on the basis of the result of the detection of the correlation peak by said peak detecting means as a reference count value; and calculating means for calculating the length or velocity of the moving object on the basis of the result of a comparison between a count value of said clock counting means and a reference count value set in said reference value setting means.

13. An apparatus according to claim 12, wherein said calculating means includes a comparator to output pulse signals of a predetermined length when the count value of the clock counting means coincides with the reference count value and a counter to obtain the length or velocity of the object by counting the pulse signals of the predetermined length.

* * * * *